US012652109B2

(12) United States Patent
Imai

(10) Patent No.: US 12,652,109 B2
(45) Date of Patent: Jun. 9, 2026

(54) TRANSMISSION CONTROL TECHNIQUES IN QUANTUM CRYPTOGRAPHIC COMMUNICATION SYSTEM

(71) Applicant: NEC Corporation, Tokyo (JP)

(72) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 18/227,260

(22) Filed: Jul. 27, 2023

(65) Prior Publication Data

US 2024/0106543 A1 Mar. 28, 2024

(30) Foreign Application Priority Data

Sep. 28, 2022 (JP) ................................. 2022-155040

(51) Int. Cl.
*H04B 10/524* (2013.01)
*H04B 10/54* (2013.01)
*H04L 9/08* (2006.01)

(52) U.S. Cl.
CPC ......... *H04B 10/524* (2013.01); *H04B 10/541* (2013.01); *H04L 9/0852* (2013.01)

(58) Field of Classification Search
CPC .... H04B 10/524; H04B 10/70; H04B 10/541; H04L 9/0852
See application file for complete search history.

(56) References Cited

U.S. PATENT DOCUMENTS 10,733,138 B2 * 8/2020 Nagarajan ............. H04L 1/0003
12,034,490 B2 * 7/2024 Paudel .................. H04L 9/0852

2007/0065155 A1 * 3/2007 Luo ...................... H04J 14/0246
398/141
2007/0248229 A1 10/2007 Kawamoto et al.
2008/0267635 A1 * 10/2008 Kawamoto .......... H04B 10/548
398/141
2015/0236852 A1 * 8/2015 Tanizawa .............. H04L 9/0858
380/278
2017/0237505 A1 * 8/2017 Lucamarini ........... H04L 9/0858
398/185

(Continued)

FOREIGN PATENT DOCUMENTS

JP 2000-101570 A 4/2000
JP 2007-266738 A 10/2007
WO 2022/015395 1/2022

OTHER PUBLICATIONS

Extended European Search Report for EP Application No. 23199400.5, dated on Feb. 28, 2024.

*Primary Examiner* — Mohamed A. Wasel
(74) *Attorney, Agent, or Firm* — Sughrue Mion, PLLC

(57) ABSTRACT

An illustrative transmitter can achieve improvement in SN ratio and stability of the signal output under control at the transmission side, even in the case of an optical transmission line having the propagation characteristics susceptible to environmental changes. The transmitter includes: an optical transmission section configured to generate weak signal light and reference light from a transmission light pulse, and transmit the signal light and the reference light to the optical transmission line; and a controller configured to modulate pulse intensity and pulse width of the transmission light pulse according to a transmission line state of probe light having propagated through the optical transmission line.

17 Claims, 11 Drawing Sheets

FIRST EXAMPLE EMBODIMENT

(56) References Cited

U.S. PATENT DOCUMENTS

| | | | | |
|---|---|---|---|---|
| 2018/0062837 A1* | 3/2018 | Tanizawa | ............. | H04L 9/0852 |
| 2021/0328784 A1* | 10/2021 | Doi | ....................... | H04L 9/0855 |
| 2022/0158743 A1* | 5/2022 | Subramanian | ....... | H04B 10/612 |
| 2023/0141134 A1* | 5/2023 | Knarr | ................... | H04L 9/0855 |
| | | | | 713/171 |
| 2023/0142045 A1* | 5/2023 | Bucklew | ............... | G06N 10/00 |
| | | | | 380/255 |

* cited by examiner

FIRST EXAMPLE EMBODIMENT

FIG. 3

FIRST EXAMPLE

FIG. 4

SECOND EXAMPLE

FIG. 7
SECOND EXAMPLE EMBODIMENT

FIG. 8

THIRD EXAMPLE

TRANSMITTER

ENTER

501 CORRECTION TIMING ?

NO

YES

502 SEND PROBE LIGHT $S_P$ TO RECEIVER

503 RECEIVE ATTENUATION RATE $(1-\gamma)$ FROM RECEIVER

504 PERFORM MODULATION OF INTENSITY AND PULSE WIDTH OF TRANSMISSION LIGHT PULSE ACCORDING TO ATTENUATION RATE $(1-\gamma)$

EXIT

TRANSMISSION CONTROL TECHNIQUES IN QUANTUM CRYPTOGRAPHIC COMMUNICATION SYSTEM

INCORPORATION BY REFERENCE

This application is based upon and claims the benefit of priority from Japanese Patent Application No. 2022-155040, filed on Sep. 28, 2022, the disclosure of which is incorporated herein in its entirety by reference.

BACKGROUND

The present application relates to quantum cryptographic communication system, and in particular to transmission control techniques for communication devices that share cryptographic keys through quantum cryptographic communication.

In the field of optical communications, quantum key distribution (QKD) systems have been studied actively and put into practical use as a means of achieving high confidentiality in transmission channels. Recently, continuous-variable QKD has been proposed, which uses continuous variables such as the quadrature-phase amplitude of light instead of discrete variables in photon units. In particular, homodyne detection has attracted attention. The reason is that the homodyne detection measures the quadrature-phase amplitude at the receiver side, allowing measurement near the quantum noise limit to achieve high quantum efficiency even in the case of ordinary photodiodes used at room temperature (Japanese Patent Application Publication No. JP2000-101570: Patent document 1).

According to Patent document 1, in continuous-variable QKD, the laser light is split into a reference light (hereinafter referred to as LO (Local Oscillation) light) and a signal light by a beam splitter at a transmitter (Alice) terminal. The LO light and the randomly phase-modulated weak signal light are transmitted to the receiver (Bob) terminal. At the receiver terminal, the arriving LO light is randomly phase-modulated. The LO light thus obtained and the arriving weak signal light are detected by two photodetectors through a beam splitter. The homodyne detection enables the extraction of the phase information of the signal light that has been phase-modulated at the transmitter.

As described in Patent document 1, the level average of the signal light obtained by homodyne detection is represented by $2\sqrt{(n1)}\sqrt{(n0)}$, wherein n1 is the number of photons of the signal light and n0 is the number of photons of the LO light. It is known that the transmission loss of an optical fiber is more than 0.2 dB/km. The optical power is attenuated by 10 dB, or $\frac{1}{10}$, at a transmission distance of 50 km, and by $\frac{1}{100}$ at a transmission distance of 100 km. Accordingly, the signal level obtained by homodyne detection is similarly reduced to $\frac{1}{10}$ and $\frac{1}{100}$ or less at transmission distances of 50 km and 100 km, respectively.

Such signal level attenuation degrades the signal-to-noise (SN) ratio in homodyne detection. It is necessary to increase the signal level to prevent SN ratio degradation. However, the installation of an optical amplifier on the transmission line cannot be adopted because the signal light is also amplified in the transmission line, which may affect the cryptographic key information. As an alternative, the laser output power of the transmitter terminal may also be increased. However, to compensate for the above signal level attenuation, the output power of the laser light source must be significantly increased, for example, from 10 mW (Class 1) to 1 W (Class 4) at a wavelength band of 1.5 μm.

Such a power-increase measure may be impractical due to upsizing of equipment, durability problems with optical components, and reduced security during transmission.

To improve the SN ratio in homodyne detection, a measure of amplifying only LO light at the receiver terminal has been proposed in Japanese Patent Application Publication No. JP2007-266738 (Patent document 2).

SUMMARY

However, Patent document 2 describes merely amplification of the LO light at the receiver (Bob) terminal, not describing how the amplification is controlled to achieve the improvement of the SN ratio.

In addition to improving the SN ratio in homodyne detection, it is also important to stabilize the signal output level obtained based on the LO light and signal light. In the Patent document 2, the amplified LO light is used to control the timing of the phase modulation process. Accordingly, although high precision in timing control may be achieved, it is not possible to obtain the stability of the signal output level.

Furthermore, the above-mentioned Patent documents 1 and 2 assume a system using the optical fiber as an optical transmission line. Accordingly, sufficient SN ratio and output stability cannot be expected in the case of using an optical transmission line which has a larger attenuation rate than optical fibers and propagation characteristics susceptible to environment. For example, assuming free space as an optical transmission line, it is necessary to take into account the amount of water vapor in the air, local variations in air density due to temperature changes, etc. In the present disclosure, free space is assumed to be optical transmission space having intensity reduction factors such as scattering and absorbing. In Patent documents 1 and 2, the issues involved in using such optical transmission lines are not recognized at all, and no measures to deal with them are described.

Furthermore, in the above-mentioned Patent Document 2, it is recognized that the increased amount of light transmitted by the transmitter (Alice) terminal increases scattered light, which leaks to the receiver (Bob) side, causing adverse effects. However, the Patent document 2 only suggests countermeasures for the receiver (Bob) terminal, and does not provide any countermeasures for the transmitter (Alice) terminal.

Therefore, an object of the present invention is to provide a quantum cryptographic communication system, a transmitter, and a transmission control method that can achieve improvement in SN ratio and stability of the signal output under control at the transmission side, even in the case of an optical transmission line having the propagation characteristics susceptible to environmental changes.

According to an illustrative embodiment of the disclosure, a transmitter that is optically connected to a receiver through an optical transmission line with propagation characteristics of light changing due to changes of environment in a quantum cryptographic communication system, the transmitter includes: an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse according to a transmission line state detected based on probe light of predetermined intensity, the probe light having propagated through the optical transmission line.

According to an illustrative embodiment of the disclosure, a transmission control method in a transmitter that is optically connected to a receiver through an optical transmission line with propagation characteristics of light changing due to changes of environment in a quantum cryptographic communication system, the method includes: by an optical transmission section, generating signal light and reference light from a transmission light pulse of coherent light, and transmitting the signal light and the reference light to the optical transmission line, wherein the signal light is weak light having quantum states and the reference light is light having no quantum states; and by a controller, modulating pulse intensity and pulse width of the transmission light pulse according to a transmission line state detected based on probe light of predetermined intensity, the probe light having propagated through the optical transmission line.

According to an illustrative embodiment of the disclosure, a quantum cryptographic communication system comprising a transmitter and a receiver, wherein the transmitter and the receiver are optically connected to each other through an optical transmission line with propagation characteristics of light changing due to changes of environment, the transmitter includes: an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse, the receiver includes: an optical reception section configured to receive received signal light and received reference light arriving from the transmitter through the optical transmission line; and a signal detector configured to generate a signal output by interfering the received reference light with the received signal light, wherein either the transmitter or the receiver further includes an attenuation rate calculator that calculates a transmission line state detected based on probe light of the predetermined intensity, the probe light having propagated through the optical transmission line, and wherein the controller is configured to modulate the pulse intensity and the pulse width of the transmission light pulse according to the transmission line state.

As described above, improvement in SN ratio and stability of the signal output can be achieved under control at the transmission side, even in the case of an optical transmission line having the propagation characteristics susceptible to environmental changes.

BRIEF DESCRIPTION OF THE DRAWINGS

FIG. 3 is a block diagram illustrating the configuration of a transmitter in a quantum cryptographic communication system according to a first example of the present disclosure.

FIG. 4 is a block diagram illustrating the configuration of a receiver and part of the transmitter in FIG. 3.

FIG. 7 is a block diagram illustrating the schematic structure of a quantum cryptographic communication system according to a second example embodiment of the present disclosure.

FIG. 8 is a block diagram illustrating the configuration of a transmitter of a quantum cryptographic communication system according to a third example of the present disclosure.

DETAILED DESCRIPTION

Figure 1:
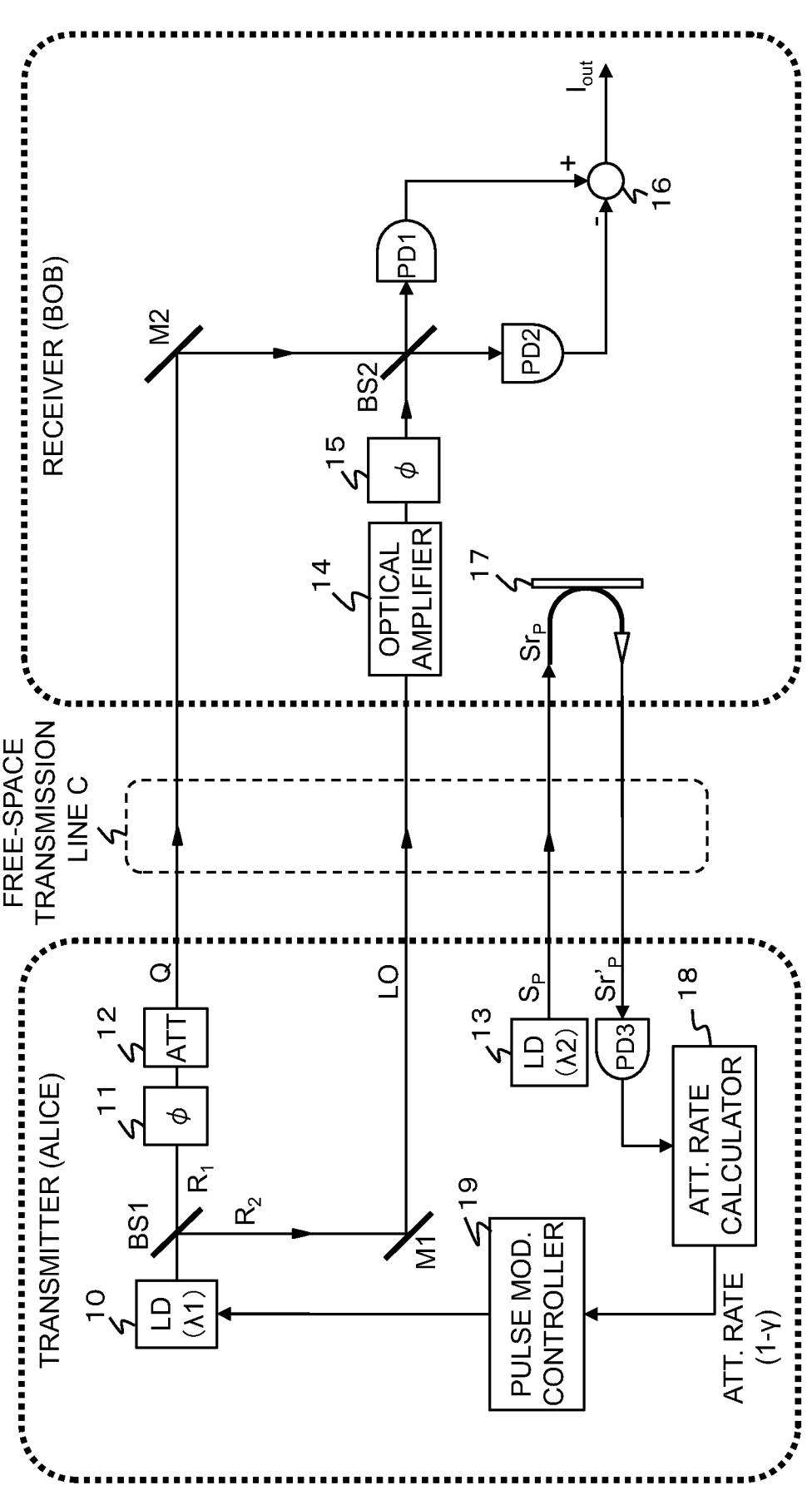
FIG. 1 is a block diagram illustrating the schematic structure of a quantum cryptographic communication system according to a first example embodiment of the present disclosure.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with other embodiments.

Hereinafter, free space is exemplified as an optical transmission channel susceptible to the environment. In a quantum cryptographic communication system according to illustrative embodiments of the present disclosure, a transmitter transmits signal light of weak intensity and reference light of normal intensity through free space to a receiver. The weak signal light has quantum states and the reference light has no quantum states. The receiver detects signal information by interfering the received signal light and the received reference light.

Furthermore, the quantum cryptographic communication system according to the present disclosure transmits probe light into the same free space where the signal light and the reference light propagate. The probe light that passes through that free space is used to measure the propagation characteristics of the laser light in the free space. In an optical transmission line such as the free space easily affected by the environment, it is important to measure the propagation characteristic which shows how the light intensity changes with distance. In the present disclosure, the transmission line state (attenuation rate or transmission rate), which indicates the degree of attenuation (or transmission), is measured as a propagation characteristic. Hereinafter, the transmission line state is assumed to be an attenuation rate. When using the attenuation rate as the propagation characteristic, if the light intensity at transmission is $P_S$, the light intensity at reception is $P_R$, and the transmission rate is $\gamma$ ($0 \leq \gamma \leq 1$), then $P_R = \gamma P_S$. In this case, the attenuation rate is represented as ($1-\gamma$).

According to the present disclosure, the intensity and pulse width of a transmission pulse are modulated according to an attenuation rate in the transmitter. More specifically, the intensity of the transmission pulse is increased and the pulse width is narrowed according to the attenuation rate without changing the energy of the transmission pulse. More precisely, it is assumed that the attenuation falls within a predetermined range (attenuation rate $(1-\gamma)<\delta$, which is referred to as normal state). Assuming that the intensity of a transmission pulse is P and its pulse width is t, the intensity of the transmission pulse is changed to $P/\gamma$ and the pulse width to $\gamma t$ when the attenuation rate $(1-\gamma)$ is increased to $\delta$ or more. As a result, the energy E per pulse is maintained constant at E=Pt, independent of the transmission rate $\gamma$ or the attenuation rate $(1-\gamma)$.

As descried above, the intensity and pulse width of the transmission light pulse are modulated depending on the attenuation rate in the free space to compensate for the attenuation of a laser beam without changing the energy of a transmission pulse. This allows the receiver to maintain the level of a signal obtained by homodyne detection within a predetermined range. Accordingly, even in the case of an optical transmission line which has a large attenuation rate and is easily affected by the environment, an improvement in SN ratio in homodyne detection and the stabilization of signal outputs can be achieved.

Measurement methods of attenuation rates are not limited to specific ones. A probe light may be transmitted from the transmitter to the receiver, and the receiver may measure the attenuation rate. The transmitter may also measure the attenuation rate using the probe light reflected back at the receiver. Alternatively, the probe light can be transmitted from the receiver to the transmitter, and the attenuation rate can be measured by the transmitter.

Example embodiments and examples of the present invention will be described in detail below with reference to the drawings. However, the components described in the following example embodiments and examples are merely examples, and are not intended to limit the technical scope of the invention to them alone.

1. First Example Embodiment

As illustrated in FIG. 1, a transmitter (Alice) and a receiver (Bob) can perform cryptographic communication using a quantum cryptographic key generated between them. Here, it is assumed that the transmitter (Alice) and receiver (Bob) are optically connected by a free-space transmission line C. The free-space transmission line C uses free space for optical transmission channels. The free-space transmission line C enables optical communications between the transmitter and the receiver simply by installing optical systems on the transmitter and the receiver, respectively, thus reducing costs of equipment because of eliminating the need for optical cables and the likes. On the other hand, the free-space transmission line C is prone to transmission losses and fluctuations in loss due to environmental conditions such as temperature and humidity. In the present disclosure as described in detail below, an adjustment means is provided to cancel out the losses caused by such environmental conditions.

The transmitter (Alice) has a laser source 10, a beam splitter BS1, a phase modulator 11, an attenuator 12 and a mirror M1, and further has a laser source 13 that emits a beam of probe light. The laser sources 10 and 13 emit laser beams of different wavelengths, respectively. Here, it is assumed that the oscillation wavelength of the laser source 10 is $\lambda 1$ and that of the laser source 13 is $\lambda 2$.

The laser source 10 generates coherent light, and the beam splitter BS1 splits the coherent light into two beams of light respectively on routes $R_1$ and $R_2$. The light on one route $R_1$ is phase-modulated by the modulator 11 and further attenuated by the attenuator 12 to become weak signal light Q having quantum states and is sent to the receiver through a quantum channel of the free-space transmission line C. The light on the other route $R_2$ is reflected by the mirror M1 and is sent to the receiver as reference light LO having normal intensity having no quantum states through a normal channel of the free-space transmission line C. As described in the above-mentioned Patent document 1, the intensity of the reference light LO is significantly greater than that of the signal light Q. For example, the signal light Q has an intensity of about one photon, while the reference light LO has an intensity of about 10 million photons.

The laser source 13 generates coherent light and sends it as probe light $S_P$ to the receiver through another normal channel of the free-space transmission line C. The probe light $S_P$ is laser light of a predetermined intensity which is sufficiently strong enough to measure the optical attenuation (or optical transmission) in the free-space transmission line C, which will be described below. The probe light $S_P$ sent by the transmitter (Alice) is preset to an intensity that can be reliably detected by the receiver (Bob), and in this example embodiment, the intensity is equal to or higher than the reference light LO transmitted by the transmitter (Alice).

The receiver (Bob) has an optical amplifier 14, a phase modulator 15, a mirror M2, a beam splitter BS2, two photodetectors PD1 and PD2, and a subtractor 16, and further has a mirror 17 that reflects the probe light received from the transmitter (Alice).

The optical amplifier 14 amplifies the received reference light LO arriving from the transmitter (Alice) directly while maintaining the wavelength and phase. The phase modulator 15 phase-modulates the amplified, received reference light LO. The phase-modulated, received reference light LO enters the beam splitter BS2. The received signal light Q arriving from the transmitter (Alice) is reflected by the mirror M2 to the beam splitter BS2. The beam splitter BS2 has equal light transmittance and reflectance, which superimposes as inputs the phase-modulated, received reference light LO and the received signal light Q reflected by the mirror M2. In other words, the beam splitter BS1 of the transmitter (Alice) and the beam splitter BS2 of the receiver (Bob) constitute one interferometer consisting of two equal-length routes $R_1$ and $R_2$ Two light beams output from the beam splitter BS2 are incident on the photodetectors PD1 and PD2. The photodetectors PD1 and PD2 convert the two light beams to electrical signals, respectively, which are output as detection signals to the subtractor 16. The subtractor 16 calculates a difference between the detection signals to output a difference signal. The difference signal is a signal output $I_{out}$ obtained by homodyne detection. The photodetectors PD1 and PD2 may employ normal photodiodes operable at room temperature.

The mirror 17 reflects received probe light $Sr_p$ arriving from the transmitter (Alice) through the free-space transmission line C. The reflected probe light $Sr_p$ is returned to the transmitter (Alice) through the same free-space transmission line C.

The transmitter (Alice) further has a probe photodetector PD3, an attenuation rate calculator 18 and a pulse modulation controller 19. The probe photodetector PD3 receives the probe light Sr'p reflected by the receiver (Bob) through the same free-space transmission line C, and converts the received intensity to an electrical signal. The electrical signal is output to the attenuation rate calculator 18. The probe photodetector PD3 may use a normal photodiode at room temperature. The attenuation rate calculator 18 calculates the attenuation rate $(1-\gamma)$ of the probe light propagating through the free-space transmission line C from the predetermined intensity of the probe light $S_p$ transmitted from the laser source 13 of the transmitter (Alice) and the received intensity of the probe light $Sr'_p$ received by the photodetector PD3. The attenuation rate $(1-\gamma)$ is output to the pulse modulation controller 19.

The pulse modulation controller 19 modulates the intensity and pulse width of a transmission light pulse emitted by the laser light source 10 according to the attenuation ratio $(1-\gamma)$. The control method of the pulse modulation controller 19 will be explained with reference to FIG. 2. To simplify the drawing, a light pulse is hereafter approximated as a rectangular shape. It is assumed that the peak value of a light pulse is the pulse power (intensity) [W] and the half-value width is the pulse width [s].

Figure 2:
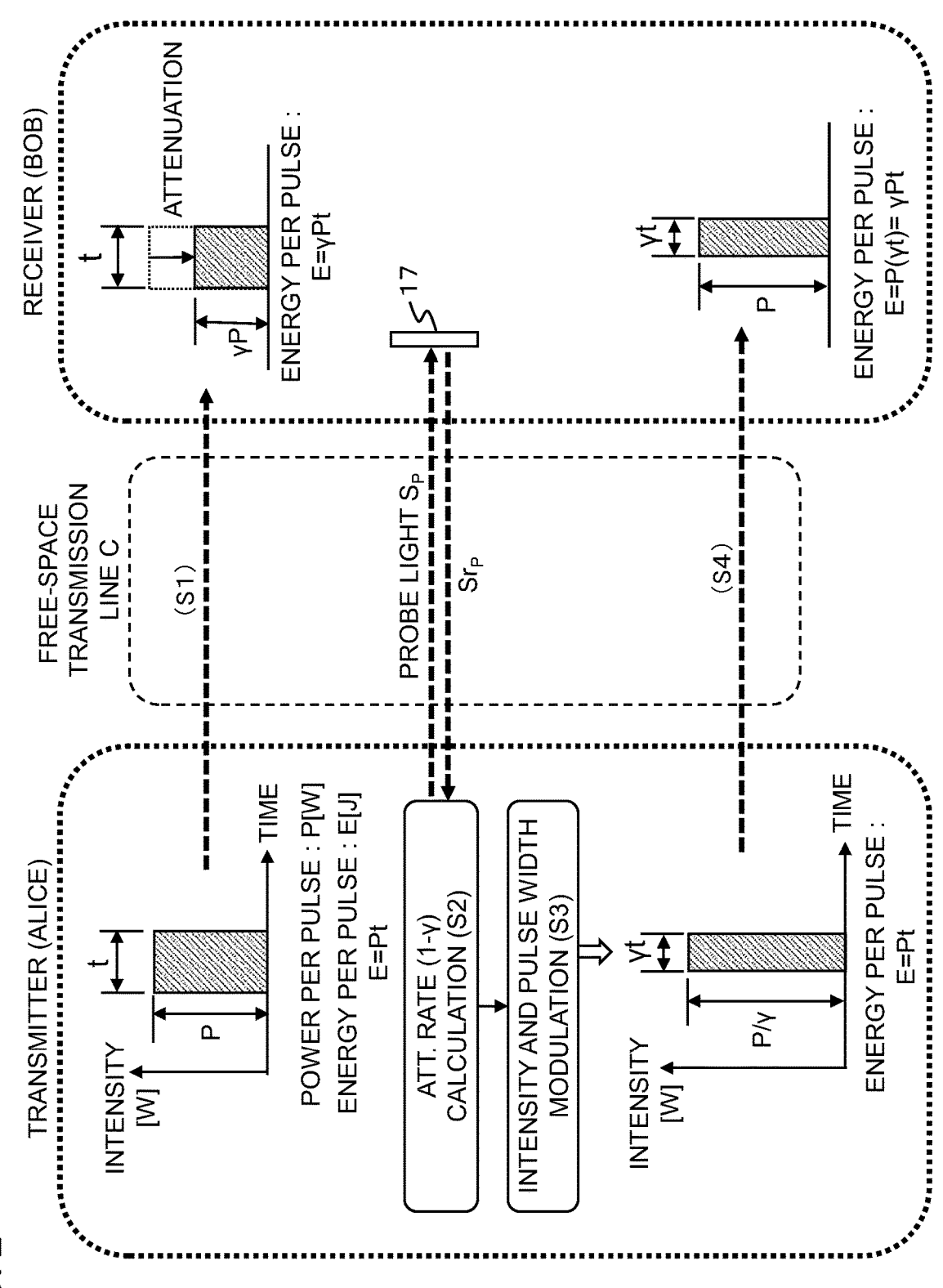
FIG. 2 is a schematic sequence diagram for explaining the modulation control of a transmission pulse in the quantum cryptographic communication system according to the first example embodiment.

In FIG. 2, assuming that the power (intensity) and pulse width of a transmission light pulse sent from the transmitter (Alice) to the free-space transmission line C are P [W] and t [s], respectively, the energy E [J] of the transmission light pulse is E=Pt. The transmission light pulse propagates through the free-space transmission line C and reaches the receiver (Bob) (step S1). The light pulse received at the receiver (Bob) has been attenuated in intensity. The attenuation rate at that time can be measured from the probe light $S_p$ as described above (step S2). If the transmittance is $\gamma$ $(0\leq\gamma\leq1)$, the energy E of the received light pulse is expressed as E=γPt.

The probe light $S_p$ is emitted from the laser source 13 of the transmitter (Alice) and reflected by the mirror 17 of the receiver (Bob). The reflected probe light $Sr_p$ propagates through the free-space transmission line C and then arrives, as received probe light $Sr'_p$, at the transmitter (Alice). The transmitter (Alice) calculates an attenuation rate $(1-\gamma)$ of the probe light from the intensity of the received probe light $Sr'_p$ (step S2). The pulse modulation controller 19 changes the intensity and pulse width of the transmission light pulse according to the attenuation rate $(1-\gamma)$ without changing the energy E per transmission light pulse (step S3). More precisely, the pulse width is shortened from t to γt and the intensity is increased from P to P/γ. As a result, the energy E per pulse is maintained at E=Pt. In this manner, the intensity and pulse width of a transmission light pulse are modulated. The transmission light pulse thus modulated is transmitted to the receiver (Bob) through the free-space transmission line C (step S4). Accordingly, the receiver (Bob) can receive light pulse of intensity P and pulse width γt. The energy E per pulse is E=γPt, which is the same as the energy of the received light pulse of step S1.

The above-mentioned pulse modulation can prevent fluctuations of the intensity of received light pulse detected by the photodetectors PD1 and PD2 of the receiver (Bob) and improve the stability along with the SN ratio of the signal output $I_{out}$. Furthermore, since the energy E per pulse does not change when the pulse width and pulse intensity are varied, the pulse modulation according to the present example embodiment can be applied to both reference light LO and signal light Q.

As described above, according to the first example embodiment of the disclosure, transmission losses from transmitter (Alice) to the receiver (Bob) and changes in loss due to environmental variations can be detected by calculating the attenuation rate $(1-\gamma)$ from intensity changes of the probe light $S_p$. The intensity and pulse width of the transmission light pulse are controlled according to the attenuation ratio $(1-\gamma)$, resulting in the improved SN ratio and output stability of the signal output $I_{out}$ obtained by homodyne detection at the receiver (Bob). In addition, switching the free-space transmission line C (such as route switching) can be performed by an optical switch or the like in response to detection of an unauthorized interception of a quantum cryptographic communication. In this case, it is possible to deal with differences in transmission loss before and after the route switch.

2. First Example

As a first example of the present disclosure, a communication system will be described, in which the signal light Q, reference light LO and probe light $S_p$ are transmitted through a free-space transmission line. The communication system shown in FIGS. 3 and 4 is an example according to the above-described first example embodiment.

Figure 3:
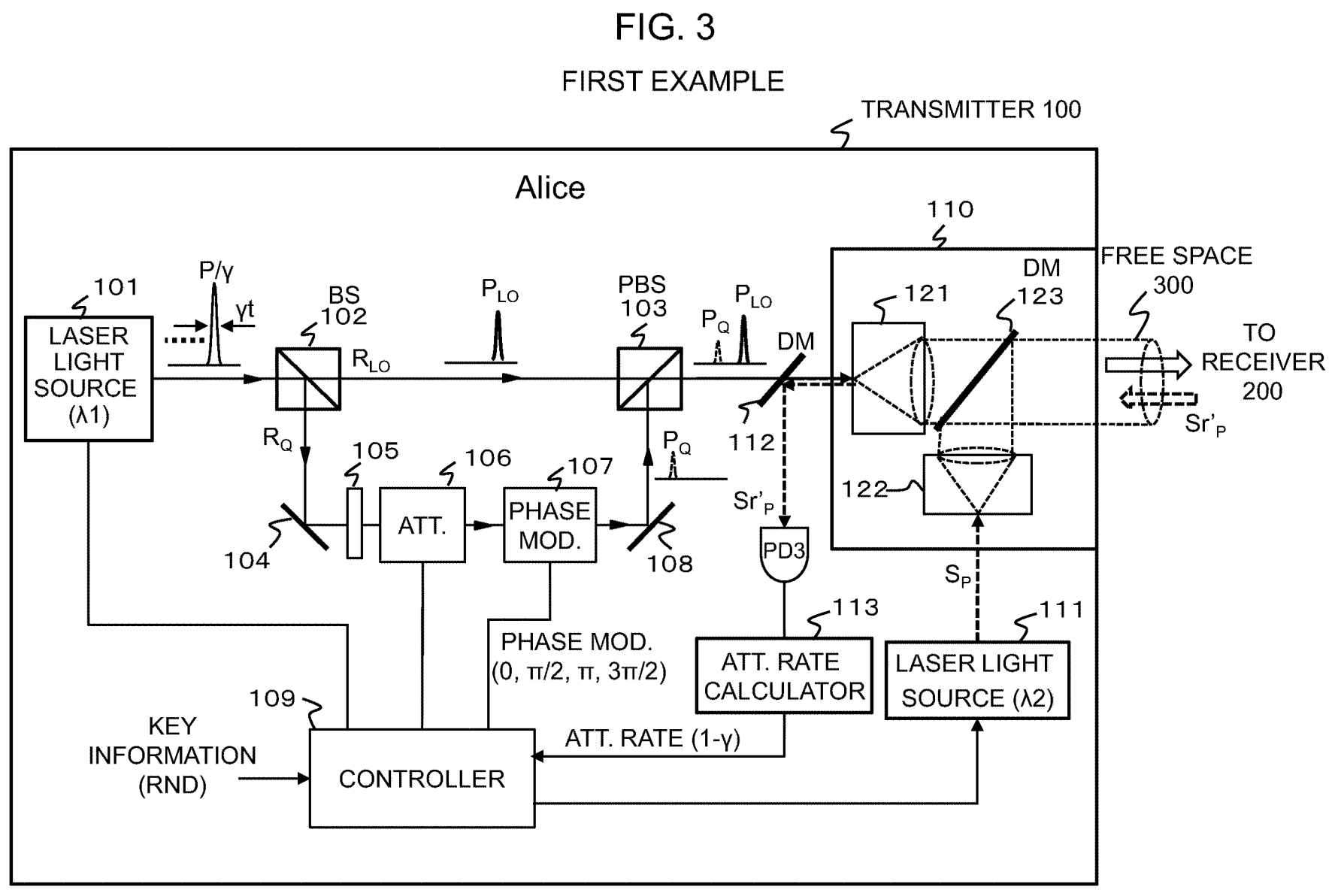
Figure 4:
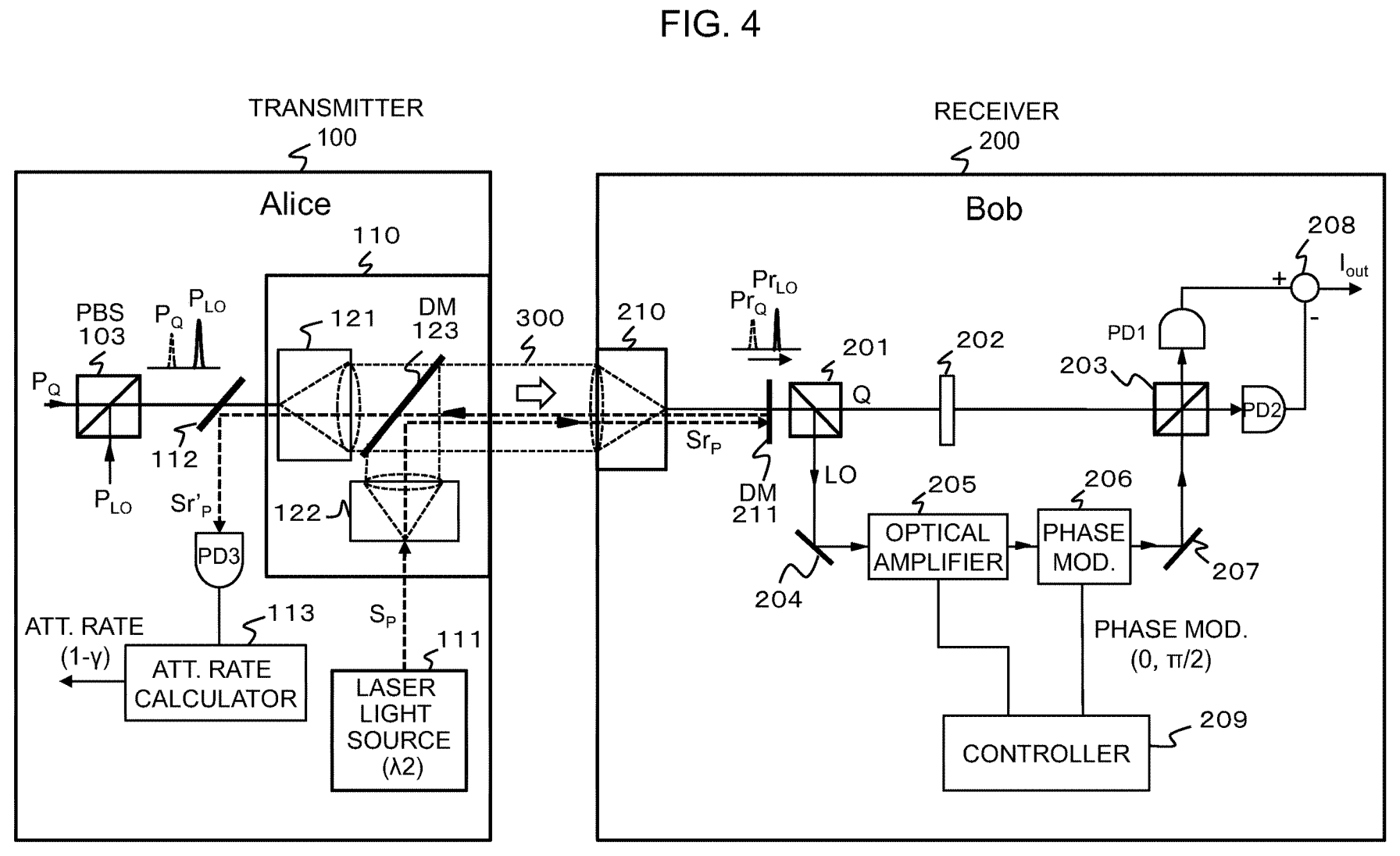

As illustrated in FIGS. 3 and 4, the quantum cryptographic communication system according to the first example includes a transmitter 100 and a receiver 200 which are optically connected by free space 300 as an optical transmission line. Here, it is assumed that the transmitter 100 and the receiver 200 are the transmitter (Alice) and the receiver (Bob), respectively.

2.1) Transmitter

As illustrated in FIG. 3, the transmitter 100 includes an optical signal system, optical probe system, transmitter-side optical system 110, and a controller 109. The optical signal system includes a laser light source 101, an unpolarizing light beam splitter (BS) 102, a polarizing light beam splitter (PBS) 103, a mirror 104, a half-wave plate 105, an attenuator 106, a phase modulator 107, and a mirror 108. The laser light source 101 outputs transmission light pulses, each of which is modulated in intensity and pulse width by the controller 109. The wavelength of transmission light pulse is $\lambda1$. As described below, the optical signal system also generates a reference light pulse $P_{LO}$ and a signal light pulse $P_Q$ from the transmission light pulse of the laser light source 101. The reference light pulse $P_{LO}$ and the signal light pulse $P_Q$ have polarization planes orthogonal to each other and are separated in time. The reference light pulse $P_{LO}$ and the signal light pulse $P_Q$ are output into the free space 300 from the transmitter-side optical system 110.

The optical probe system includes a laser light source 111, a dichroic mirror (DM) 112, and a photodetector PD3. The laser light source 111 emits linearly polarized probe light $S_p$ as with the laser light source 101. The probe light $S_p$ is output to the free space 300 from the transmitter-side optical system 110. The probe light $S_p$ has a wavelength of $\lambda2$ $(\neq\lambda1)$ and a controlled intensity. The probe light $S_p$ may be a light pulse of predetermined pulse width or a laser light beam that lasts for a certain length of time. As described later, the probe light $S_p$ travels to the receiver 200 and back through the free space 300. Accordingly, the intensity of the probe light $S_p$ emitted by the laser source 111 is controlled so that the received probe light $Sr'_p$ reflected from the receiver 200 is sufficiently large in intensity.

In general, a dichroic mirror (DM) is an optical element that transmits light in a specific wavelength region and reflects light in other wavelength regions. The DM 112 in this example is configured to transmit light of wavelength $\lambda1$ and reflect light of wavelength $\lambda2$. Accordingly, the reference light pulse $P_{LO}$ and the signal light pulse $P_Q$ of wavelength λ1 transmit through the DM 112. The received probe light $Sr'_p$ of wavelength λ2 is reflected by the DM 112 to the photodetector PD3 for probe detection.

The transmitter-side optical system 110 includes beam expanders 121 and 122 and a dichroic mirror (DM) 123. The beam expanders 121 and 122 are optical elements that convert the light beam input from an optical fiber on input port to a collimated light beam of a larger diameter. The DM 123 in this example is configured to transmit light of wavelength λ1 and reflect (partially transmit) light of other wavelengths (including λ2). Accordingly, the reference light pulse $P_{LO}$ and signal light pulse $P_Q$ of wavelength λ1 are transmitted through the DM 123. The probe light $S_p$ of wavelength λ2 is partially reflected and the received probe light $Sr'_p$ is partially transmitted.

The beam expanders 121 and 122 are positioned on the plane defined by their optical axes so that their optical axes are orthogonal. The DM 123 is positioned in an inclined posture such that it is inclined 45° counterclockwise to the traveling direction of the outgoing light from the beam expander 121 and clockwise to the traveling direction of the outgoing light from the beam expander 122. Accordingly, the light of wavelength λ1 input from beam expander 121 is transmitted through the DM 123 to the free space 300, while the light of wavelength λ2 input from the beam expander 122 is reflected by the DM 123 to the free space 300. In this example, the reference light pulse $P_{LO}$ and the signal light pulse $P_Q$ of wavelength λ1 are transmitted through the DM 123 and the probe light $S_p$ of wavelength λ2 is reflected by the DM 123. Accordingly, the reference light pulse $P_{LO}$, the signal light pulse $P_Q$ and the probe light $S_p$ propagate through the free space 300 toward the same receiver 200.

The controller 109 controls the laser light source 101, the attenuator 106, and the phase modulator 107 to generate two successive pulses of a reference light pulse $P_{LO}$ and a signal light pulse $P_Q$ as described above. The controller 109 also controls the laser source 111 to output the probe light $S_p$ at predetermined periods or at a desired timing. The intensity of the probe light $S_p$ may be increased or decreased according to the attenuation rate (1–γ).

The received probe light $Sr'_p$ reflected from the receiver 200 is partially transmitted through the DM 123 and reflected from the DM 112 to the photodetector PD3 for probe detection. The attenuation rate calculator 113 inputs the electrical signal indicating the intensity of the received probe light $Sr'_p$ from the photodetector PD3, calculates the attenuation rate (1–γ) due to propagation through the free space 300, and outputs it to the controller 109. The controller 109 controls the intensity and pulse width of a transmission light pulse emitted by the laser source 101 according to the attenuation rate (1–γ), which has been described in detail using FIG. 2.

The functions of the controller 109 and the attenuation rate calculator 113 may be implemented by executing computer programs stored in a memory (not shown in the figure) on a computer including a CPU (Central Processing Unit).

<Operation of Transmitter>

The laser light source 101 outputs transmission light pulses of wavelength λ1 to the input port of the unpolarizing light beam splitter 102. Each transmission light pulse has the intensity and pulse width controlled by the controller 109. The transmission light pulse is split into two light pulses by the unpolarizing beam splitter 102. One light pulse is sent to a reference-side route $R_{LO}$ and the other light pulse is sent to the signal-side route $R_Q$. The light pulse on the reference-side route $R_{LO}$ is a normal-intensity reference light pulse $P_{LO}$ having no quantum states. The reference light pulse $P_{LO}$ passes through the polarizing beam splitter 103 as it is, and enters the beam expander 121 of the transmitter-side optical system 110 through the DM 112.

The signal-side route $R_Q$ includes the mirror 104, the half-wave plate 105, the attenuator 106, the phase modulator 107, and the mirror 108. The signal-side route $R_Q$ has a longer optical route than the reference-side route $R_{LO}$. The half-wave plate 105 rotates the plane of polarization of the light pulse on the route $R_Q$ by 90 degrees. The attenuator 106 attenuates the light pulse to output a weak light pulse having quantum states. The phase modulator 107 performs phase modulation on the weak light pulse to generate the signal light pulse $P_Q$. The signal light pulse $P_Q$ is reflected by the mirror 108 to the polarizing beam splitter 103. The attenuator 106 and phase modulator 107 may be arranged in reverse order with respect to the traveling direction of the light pulse.

The polarization plane of the signal light pulse $P_Q$ is rotated by 90 degrees by the half-wave plate 105. Accordingly, the signal light pulse $P_Q$ is reflected by the polarizing beam splitter 103 to the beam expander 121 of the transmission optical system 110. However, the signal light pulse $P_Q$ enters the beam expander 121 behind the reference light pulse $P_{LO}$ by a time delay caused by the difference in optical length between the routes $R_Q$ and $R_{LO}$. Thus, from a single light pulse P, a reference light pulse $P_{LO}$ and a signal light pulse $P_Q$ are generated, which are orthogonal in polarization plane to each other and separated in time. In the case where the unpolarizing beam splitter 102 is replaced with a polarizing beam splitter 103, the half-wave plate 105 can be eliminated.

The controller 109 controls the overall operation of the transmitter 100 and, in this example, controls the laser light source 101, the attenuator 106, the phase modulator 107, and the laser light source 111. The phase modulator 107, under the control of the controller 109, performs four different phase modulations (0, π/2, π, 3π/2) on each weak light pulse output from the attenuator 106 according to the original random numbers of a cryptographic key to generate the signal light pulse $P_Q$. Thus, two successive pulses are generated as a double pulse, which includes a normal-intensity reference light pulse $P_{LO}$ and a phase-modulated signal light pulse $P_Q$. a train of double pulses enters the beam expander 121 of the transmitter optical system 110.

The beam expander 121 converts the reference light pulse $P_{LO}$ and signal light pulse $P_Q$ respectively to collimated reference light pulse and collimated signal light pulse having larger diameters, and transmits them through the DM 123 into the free space 300.

On the other hand, the laser light source 111 outputs probe light $S_p$ of a predetermined duration of time to the beam expander 122 at predetermined intervals or at desired timing according to the control of the controller 109. The collimated probe light of wavelength λ2, whose diameter is expanded by the beam expander 122, is reflected by the DM 123 to the free space 300. Hereafter, the laser light source 111 is assumed to output the probe light $S_p$ at a timing for each predetermined time slot.

In this way, through the free space 300, the double pulse of wavelength λ1 including reference light pulse $P_{LO}$ and signal light pulse $P_Q$ and the probe light $S_p$ of wavelength λ2 lasting for a given time at a given timing are transmitted. As described below, the probe light $S_p$ of wavelength λ2 is reflected by the receiver 200 and returns through the same free space 300. As described above, the received probe light $Sr'_p$ of wavelength λ2 reflected from the receiver 200 is used to calculate the attenuation rate $(1-\gamma)$. The intensity and pulse width of a transmission light pulse emitted by the laser light source 101 are controlled according to the attenuation rate $(1-\gamma)$. In addition, the intensity of the probe light $S_p$ emitted by the laser light source 111 may be controlled according to the attenuation rate $(1-\gamma)$ so that the received probe light $Sr'_p$ reflected from the receiver 200 is of sufficient intensity.

2.2) Receiver

As illustrated in FIG. 4, a beam expander 210 of the receiver 200 is a receiver-side optical system which is installed so that its optical axis is aligned with the transmitter-side optical system 110 of the transmitter 100. This allows the beam expander 210 of the receiver 200 to receive the reference light pulse $P_{LO}$ and the signal light pulse $P_Q$ and the probe light $S_p$ through the free space 300. It is assumed that the reference light pulse $P_{LO}$, signal light pulse $P_Q$ and probe light $S_p$ received from the transmitter 100 are denoted as $Pr_{LO}$, $Pr_Q$ and $Sr_p$, respectively.

The output port of the beam expander 210 is optically connected to the input port of a polarizing beam splitter 201 through a DM 211. The DM 211 is configured to transmit light of wavelength $\lambda 1$ and reflect light of wavelength $\lambda 2$. Accordingly, the received reference light pulse $Pr_{LO}$ and the receive signal light pulse $Pr_Q$ transmit through the DM 211 to the input port of the polarizing beam splitter 201. In contrast, the received probe light $Sr_p$ is reflected by the DM 211 and returned from the beam expander 210 to the transmitter 100 through the free space 300.

At the transmitter 100, the received probe light $Sr'_p$ reflected from the receiver 200 partially transmits through the DM 123 and is reflected by the DM 112 to the photodetector PD3 as described above. At that time, if disturbances such as air fluctuations in the free space 300 occur, the output light of the beam expander 121 may not be focused correctly on the core of the optical fiber. Also, the intensity of the output light of the beam expander 121 may be greatly reduced due to disturbances such as water vapor and particulates in the free space 300. Accordingly, the attenuation rate $(1-\gamma)$ of the received probe light $Sr'_p$ reflected from the receiver 200 reflects not only transmission losses in the free space 300 but also decreases in the intensity of the received probe light $Sr_p$ at the beam expander 210 and the intensity of the received probe light $Sr'_p$ at the beam expander 121. In other words, the attenuation of the received probe light $Sr'_p$ reflected from the receiver 200 can also be caused by misalignment of the focusing position of the output light of the beam expanders 210 and 121 due to disturbances in the free space 300, as described above. According to the present example, the attenuation rate $(1-\gamma)$ of the probe light is measured based on the received probe light $Sr'_p$ reflected from the receiver 200. The intensity and pulse width of a transmission light pulse emitted from the laser light source 101 is controlled according to the attenuation rate $(1-\gamma)$.

In addition to the beam expander 210 and the DM 211, the receiver 200 includes an optical signal system, an optical reference system, and a signal detection section. A controller 209 controls the overall operation of the receiver 200. The optical signal system includes a polarizing beam splitter 201, a half-wave plate 202, and an unpolarizing beam splitter 203. The optical reference system includes the polarizing beam splitter 201, a mirror 204, an optical amplifier 205, a phase modulator 206, a mirror 207 and the unpolarizing beam splitter 203. The signal detection section includes photodetectors PD1 and PD2 and a subtractor 208.

The polarizing beam splitter 201 inputs a received reference light pulse $Pr_{LO}$ and a received signal light pulse $Pr_Q$ from the beam expander 210. As mentioned above, the polarization plane of the received reference light pulse $Pr_{LO}$ is orthogonal to that of the signal light pulse $Pr_Q$.

The received signal light pulse $Pr_Q$ passes through the polarizing beam splitter 201 as it is and enters the half-wave plate 202. Since the half-wave plate 202 rotates the polarization plane by 90 degrees, the received signal light pulse $Pr_Q$ transmitted through the half-wave plate 202 has the same polarization plane as the received reference light pulse $Pr_{LO}$. The received signal light pulse $Pr_Q$ transmitted through the half-wave plate 202 enters the first input port of the unpolarizing light beam splitter 203.

On the other hand, the received reference light pulse $Pr_{LO}$ is reflected by the polarizing beam splitter 201 to exit the second output port of the polarizing beam splitter 201. The received reference light pulse $Pr_{LO}$ reflected from the polarizing beam splitter 201 is reflected by the mirror 204 to the second input port of the unpolarizing beam splitter 203 through the optical amplifier 205, the phase modulator 206 and the mirror 207.

It should be noted that the route of the received signal light pulse $Pr_Q$ is the same length as the route $R_{LO}$ of the transmitter 100, and the route of the received reference light pulse $Pr_{LO}$ is the same length as the route $R_Q$ of the transmitter 100. Accordingly, the received signal light pulse $Pr_Q$ and the received reference light pulse $Pr_{LO}$, which enter the first and second input ports of the unpolarizing beam splitter 203, respectively, reach the unpolarizing beam splitter 203 through different optical paths of the same length from the unpolarizing beam splitter 102 of the transmitter 100. The optical configuration of the transmitter 100 and receiver 200 thus constitutes an interferometer described in FIG. 1.

The optical amplifier 205 may employ, for example, an EDFA (Erbium-Doped Fiber Amplifier) or SOA (Semiconductor Optical Amplifier). The optical amplifier 205 amplifies the received reference light pulse $Pr_{LO}$ while maintaining its wavelength and phase. The phase modulator 206 phase-modulates the optically amplified, received reference light pulse $Pr_{LO}$. The phase modulation of the phase modulator 206 is controlled by the controller 209. As described above, the phase modulator 107 of the transmitter 100 performs four different phase modulations $(0, \pi/2, \pi, 3\pi/2)$ on the signal light pulse $P_Q$ to be transmitted, while the phase modulator 206 of the receiver 200 performs two different phase modulations $(0, \pi/2)$ on the received reference light pulse $Pr_{LO}$. The received reference light pulse $Pr_{LO}$ thus phase-modulated is reflected by the mirror 207 to the unpolarizing beam splitter 203.

The unpolarizing beam splitter 203 inputs the received signal light pulse $Pr_Q$, whose polarization plane has been rotated by 90 degrees by the half-wave plate 202, and the received reference light pulse $Pr_{LO}$ that has been phase-modulated by the phase modulator 206. The unpolarizing beam splitter 203 has equal light transmittance and reflectance. Accordingly, the unpolarizing beam splitter 203 superimposes the received signal light pulse $Pr_Q$ and the received reference light pulse $Pr_{LO}$ to emit the resultant from the two output ports. The two output ports of the unpolarizing beam splitter 203 are optically connected to the photodetectors PD1 and PD2 through optical transmission lines, respectively. The photodetectors PD1 and PD2 receive two outgoing beams of light from the two output ports of the unpolarizing beam splitter 203, respectively. As described before, normal photodiodes may be used as the photodetectors PD1 and PD2 at room temperature.

The subtractor 208 performs subtraction calculation of detection signals output from the photodetectors PD1 and PD2, respectively, and outputs the resulting difference signal as signal output $I_{out}$ obtained by homodyne detection. As described in FIG. 2, the intensity and pulse width of a transmission light pulse emitted from the laser source 101 are controlled according to the attenuation rate $(1-\gamma)$ calculated using the intensity of the received probe light $Sr'_p$, thereby compensating for attenuations in the free space 300 (step S3 of FIG. 2). This can achieve improvements in SN ratio and stability of the signal output $I_{out}$ obtained at the receiver 200. In addition, when the free-space transmission line C is switched by using an optical switch or other means because of detection of an unauthorized interception of quantum cryptographic communication, the difference in transmission loss before and after the route switching can also be addressed.

2.3) Modulation Control of Transmission Light Pulses

In the quantum cryptographic communication system according to the present example, cryptographic communication using a quantum cryptographic key is assumed to be performed between the transmitter 100 and the receiver 200 with reference to predetermined time slots. According to the present example, as illustrated in FIG. 5, the controller 109 obtains the attenuation rate $(1-\gamma)$ from the attenuation rate calculator 113 for each communication time slot and controls the intensity and pulse width of each transmission light pulse of the laser light source 101.

Figure 5:
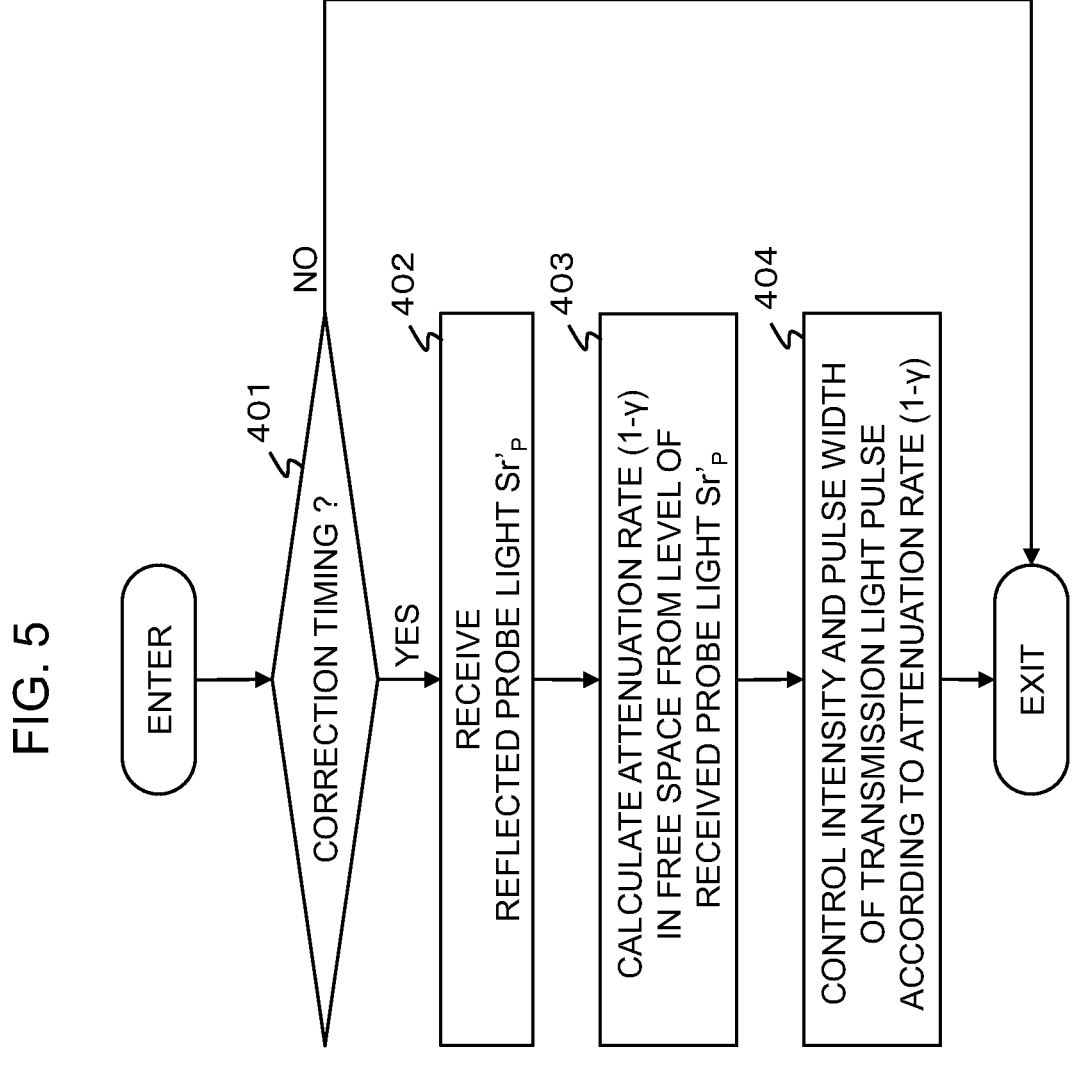
FIG. 5 is a flowchart illustrating a transmission control method of the transmitter in the first example of the present disclosure.

In FIG. 5, the controller 109 determines whether or not it is the correction timing for each predetermined time slot (operation 401). If it is a correction timing (YES in operation 401), the photodetector PD3 inputs the received probe light $Sr'_p$ reflected from the receiver 200 and detects a level signal (operation 402). The attenuation rate calculator 113 inputs the level signal from the photodetector PD3 and calculates the attenuation rate $(1-\gamma)$ at the present time based on the ratio of the received level to the predetermined transmission level at the time of transmission (operation 403). The controller 109 controls the laser light source 101 to output the controlled intensity $(P/\gamma)$ and pulse width $(\gamma t)$ of a transmission light pulse according to the attenuation rate $(1-\gamma)$ at the present time (operation 404). If it is not the correction timing (NO in operation 401), the intensity and pulse width of a transmission light pulse are kept at the previously set values.

Thus, the controller 109 of the transmitter 100 controls the intensity $(P/\gamma)$ and pulse width $(\gamma t)$ of the transmission light pulses according to the attenuation ratio $(1-\gamma)$, allowing the level of the signal output $I_{out}$ obtained at the receiver 200 to be kept within a predetermined range. For example, as the attenuation of a light pulse reaching the receiver 200 becomes larger (or smaller), in other words, as the value of $\gamma$ becomes smaller (or larger), the intensity of the transmission light pulse is set to $P/\gamma$ and the pulse width to $\gamma t$. In this manner, a change in attenuation rate caused by the environment can be canceled out to maintain the level of the signal output $I_{out}$ with stability.

The above-mentioned functions of the controller 109 and the attenuation rate calculator 113 can be implemented by executing a program on a computer such as a central processing unit (CPU) or processor.

3. Second Example

Figure 6:
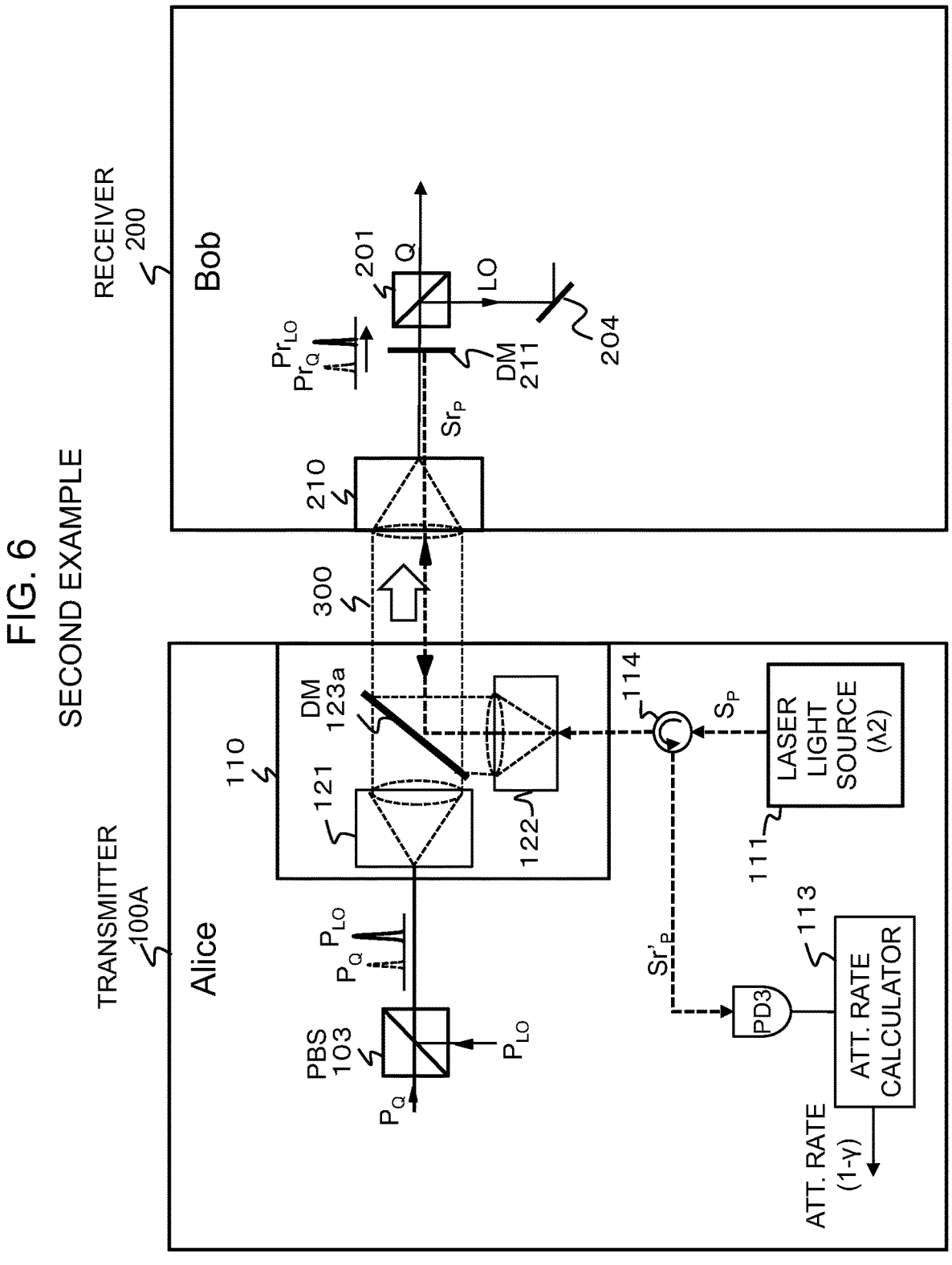
FIG. 6 is a block diagram illustrating optical probe transmitting and receiving systems included respectively in a transmitter and a receiver of a quantum cryptographic communication system according to a second example of the present disclosure.

As illustrated in FIG. 6, a system according to a second example of the present disclosure includes a transmitter

100A different from the transmitter 100 of the first example shown in FIG. 3. Specifically, the optical probe system of the transmitter 100A is different from that of the first example. In FIG. 6, components having the same functions as those of the first example will be denoted by the same reference numerals and their descriptions will be omitted. The different part of the transmitter 100A will be mainly described below.

The optical probe system of the transmitter 100A includes the laser source 111, an optical circulator 114 and the photodetector PD3 for probe detection. Accordingly, the need for the DM 112 as in the first example is eliminated. The optical circulator 114 is provided between the laser source 111 and the beam expander 122. The optical circulator 114 inputs the probe light $S_p$ from the laser source 111 and outputs it to the beam expander 122. The optical circulator 114 inputs the received probe light $Sr'_p$ reflected from the receiver 200 from the beam expander 122 and outputs it to the photodetector PD3 for probe detection. According to the present example, the DM 123a is configured to transmit the reference light pulse $P_{LO}$ and signal light pulse $P_Q$ of wavelength $\lambda 1$ and reflect the probe light $S_p$ and the received probe light $Sr'_p$ of wavelength $\lambda 2$.

The optical circulator 114 allows the received probe light $Sr'_p$ of wavelength $\lambda 2$ reflected from the receiver 200 to be transferred from the beam expander 122 to the photodetector PD3. As described above, the attenuation rate calculator 113 calculates the attenuation rate $(1-\gamma)$ using the intensity of the received probe light $Sr'_p$. The intensity and pulse width of the transmission light pulse emitted from the laser light source 101 are modulated according to the attenuation rate $(1-\gamma)$. Since the other optical and electrical configurations and functions have been described in the first example, their details are omitted.

4. Second Example Embodiment

According to the first example embodiment and the first and second examples as described above, the transmitter (Alice) receives the probe light $Sr'_p$ reflected from the receiver (Bob) and calculates the attenuation rate $(1-\gamma)$ from the intensity of the received probe light $Sr'_p$. The present invention is not limited to these example embodiment and examples. The attenuation rate $(1-\gamma)$ may be calculated at the receiver (Bob) using the received probe light $Sr_p$ and the information of the calculated attenuation rate $(1-\gamma)$ may be notified to the transmitter (Alice). In a second example embodiment illustrated in FIG. 7, components having the same functions as those of the first example embodiment will be denoted by the same reference numerals and their descriptions will be omitted. The different part of the second example embodiment will be mainly described below.

Figure 7:
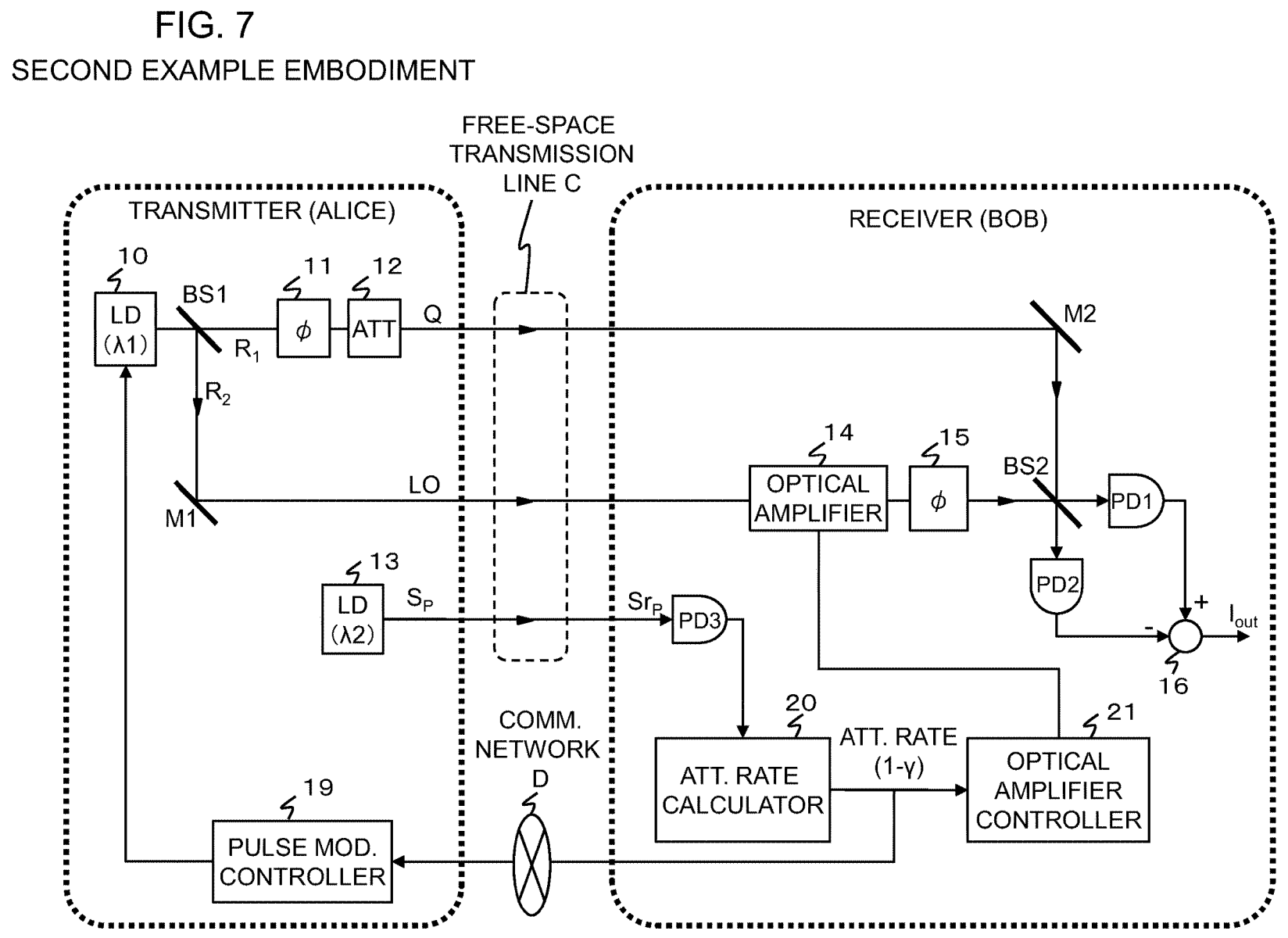

As illustrated in FIG. 7, in a system according to the second example embodiment of the disclosure, the transmitter (Alice) and the receiver (Bob) are optically connected by a free-space transmission line C as in the first example embodiment. According to the second example embodiment, the transmitter (Alice) does not have an attenuation rate calculator, while the receiver (Bob) has a photodetector PD3 for probe detection, an attenuation rate calculator 20 and an optical amplifier controller 21.

The photodetector PD3 for probe detection receives the probe light $Sr_p$ of wavelength $\lambda 2$ from the transmitter (Alice) through the free-space transmission line C. The attenuation rate calculator 20 calculates the attenuation rate $(1-\gamma)$ from the output of the photodetector PD3. The attenuation rate $(1-\gamma)$ is sent to the transmitter (Alice) through a communication network D. The communication network D may be an existing telecommunication or optical communication network, in which information including the attenuation rate $(1-\gamma)$ may be transferred using packet communication such as the Internet. The pulse modulation controller 19 of the transmitter (Alice) modulates the intensity and pulse width of a transmission light pulse according to the attenuation rate $(1-\gamma)$ as already described.

Furthermore, in the receiver (Bob), the optical amplifier controller 21 controls optical amplification of the received reference light LO according to the attenuation ratio $(1-\gamma)$ so that the signal level of the signal output $I_{out}$ is maintained within a predetermined range. More precisely, the gain of the optical amplifier 14 is increased relative to a predetermined value as the intensity of the received probe light $Sr_p$ becomes smaller (transmission factor $\gamma$ becomes smaller). The gain of the optical amplifier 14 is decreased relative to the predetermined value as the intensity of the received probe light $Sr_p$ increases (transmission factor $\gamma$ becomes larger). Accordingly, a change in attenuation (or transmittance) caused by the environment can be canceled out to maintain the signal level of the signal output $I_{out}$. The received reference light LO is amplified by the optical amplifier 14 according to the attenuation rate $(1-\gamma)$, resulting in the increased signal level of the signal output $I_{out}$ and the improved SN ratio of the signal output $I_{out}$. Furthermore, the gain of the optical amplifier 14 is controlled according to the attenuation ratio $(1-\gamma)$, resulting in the improved stability of the signal output $I_{out}$.

The gain of the optical amplifier 14 may be determined for the attenuation rate $(1-\gamma)$ using a function or table prepared in advance. In other words, an experimentally obtained function can be prepared in advance and the gain can be calculated as a function of the attenuation rate $(1-\gamma)$. Alternatively, a correspondence table between the attenuation rate $(1-\gamma)$ and the gain has been experimentally obtained. The gain of the optical amplifier 14 can be calculated for the attenuation rate $(1-\gamma)$ using the correspondence table.

The optical amplifier 14 may employ a controllable-gain optical amplifier that amplifies the received reference light LO received from the transmitter (Alice) while maintaining its wavelength and phase. For example, an EDFA or a SOA can be used as such an optical amplifier 14. In the case where the EDFA is used for the optical amplifier 14, the received reference light LO can be amplified with a high efficiency such as more than 80% amplification efficiency for pumping light. The optical gain of the EDFA can be controlled by controlling the current supplied to the laser that is the source of the pumping light. In the case where the optical amplifier 14 is the SOA, the gain can be controlled by the current supplied to the SOA.

As described above, the system according to the second example embodiment calculates the attenuation rate $(1-\gamma)$ at the receiver (Bob) and notifies it to the transmitter (Alice). The transmitter (Alice) modulates the transmission light pulse to increase its intensity and narrow its pulse width according to the attenuation rate $(1-\gamma)$. The receiver (Bob) controls the optical amplification factor of the receive reference optical LO according to the attenuation ratio $(1-\gamma)$. The modulation control at the transmitter (Alice) and gain control at the receiver (Bob) can maintain the signal output level $L_{out}$ at a threshold value LTH or more at the receiver (Bob), thus improving the SN ratio in homodyne detection at the receiver side. Furthermore, the attenuation rate $(1-\gamma)$ can be used to maintain the optical signal output level $L_{out}$ within a predetermined range, achieving stabilization of the signal output $I_{out}$.

5. Third Example

The quantum cryptographic communication system according to a third example of the present disclosure is an example of the second example (FIG. 7) described above. Hereinafter, with reference to FIGS. 8 and 9, the configuration and functions that differ from those of the first and second examples shown in FIGS. 3 and 4 will be described. Components having the same functions as those of the first example embodiment will be denoted by the same reference numerals and their descriptions will be omitted. The different part of the third example will be mainly described below.

Figure 8:
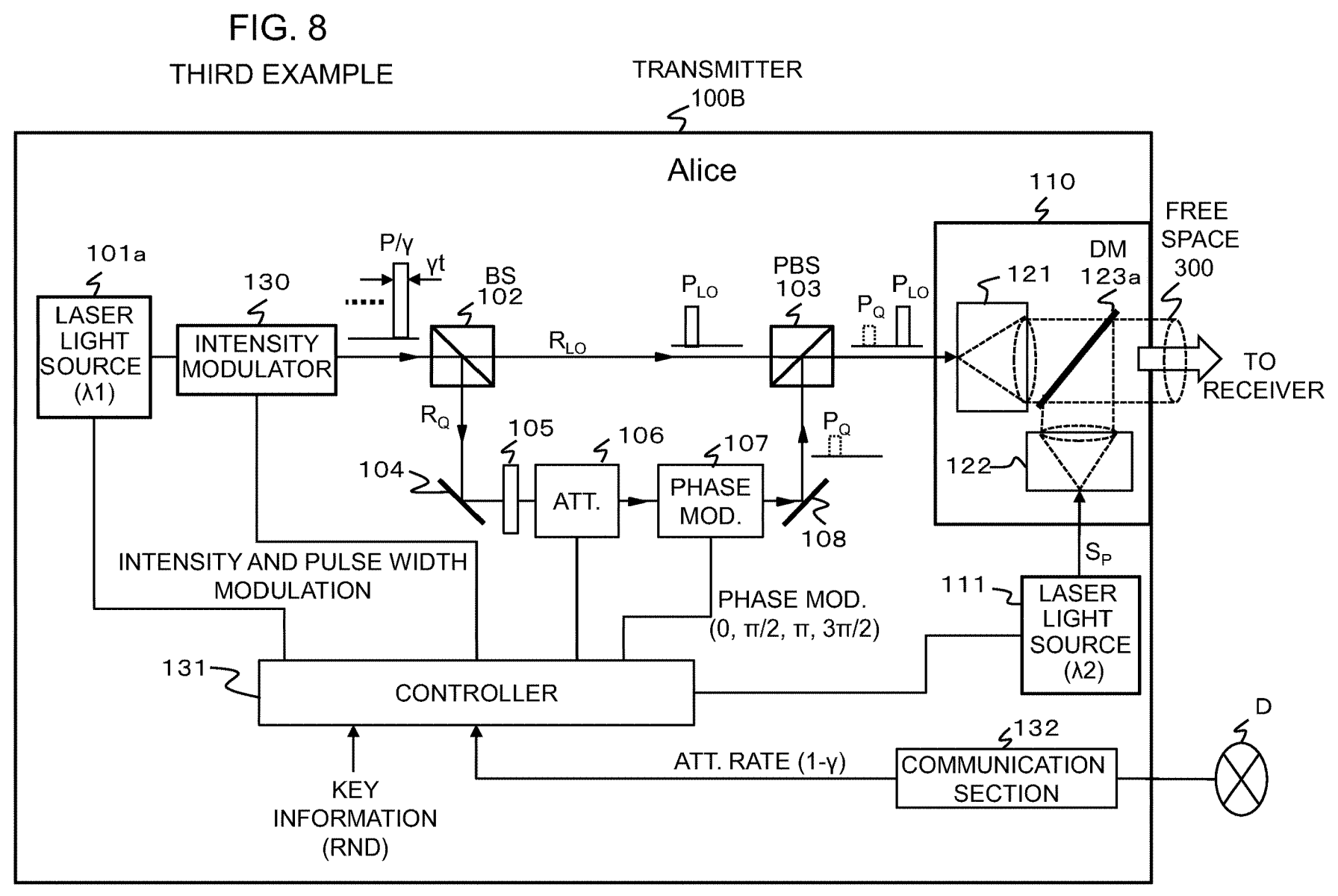
Figure 9:
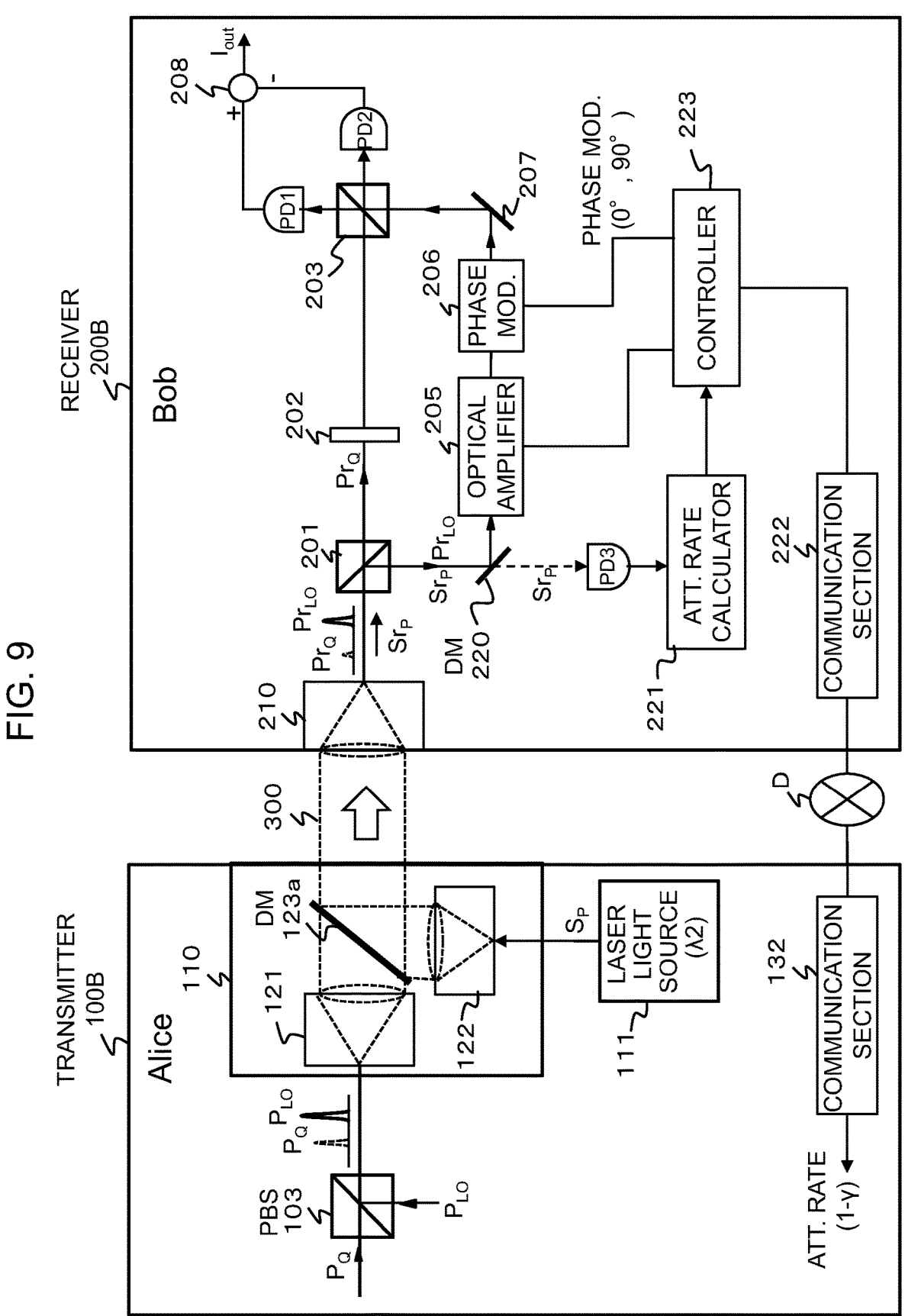
FIG. 9 is a block diagram illustrating the configuration of a receiver of a quantum cryptographic communication system according to the third example.

As illustrated in FIGS. 8 and 9, the quantum cryptographic communication system according to the third example includes a transmitter 100B and a receiver 200B, which are optically connected to each other through the free space 300 as an optical transmission line. Further, the transmitter 100B and the receiver 200B are connected to enable the communication with each other through a normal communication network D.

5.1) Transmitter

Referring to FIG. 8, the transmitter 100B includes an optical signal system, an optical probe system, a transmitter-side optical system 110, a controller 131, and a communication section 132. The optical signal system includes a laser light source 101a, an intensity modulator 130, an unpolarizing beam splitter (BS) 102, a polarizing beam splitter (PBS) 103, a mirror 104, a half-wave plate 105, an attenuator 106, a phase modulator 107 and a mirror 108. In this example, the laser source 101a outputs continuous light of wavelength λ1 instead of light pulses.

The optical probe system includes a laser light source 111 which emits linearly polarized probe light $S_p$ as with the laser light source 101. The probe light $S_p$ is output to the free space 300 from the transmitter-side optical system 110. The laser light source 111 outputs a laser beam of wavelength λ2, which is different from the wavelength λ1. Since the transmitter-side optical system 110 has the same structure and functions as in the second example, its detailed description is omitted.

The intensity modulator 130 is provided between the laser light source 101a and the unpolarizing beam splitter 102. The laser source 101a outputs a linearly polarized continuous light of wavelength λ1 to the intensity modulator 130 according to the control of the controller 131. The intensity modulator 130 converts the continuous light into transmission light pulses of intensity P/γ and pulse width γt according to the control of the controller 131. For example, a Mach-Zehnder (MZ) modulator may be employed as the intensity modulator 130.

It is possible to replace the laser light source 101a with the laser light source 101 that outputs light pulses as in the first example. In that case, the laser light source 101 is driven by the controller 131 to output a transmission light pulse of intensity P/γ and pulse width γt without the intensity modulator 130.

The communication section 132 receives information including the attenuation rate $(1-\gamma)$ from the receiver 200B through the communication network D and outputs it to the controller 131. The controller 131 controls the intensity modulator 130 according to the attenuation rate $(1-\gamma)$, thereby the intensity modulator 130 generating transmission light pulses with intensity P/γ and pulse width γt. Furthermore, the controller 131 controls the attenuator 106 and the phase modulator 107 to generate the signal light pulse $P_Q$. In this manner, the reference light pulse $P_{LO}$ and the signal light pulse $P_Q$ are generated and enters the polarizing beam splitter 103 as described above. The controller 131 also controls the laser light source 111 to output the probe light $S_p$ at predetermined periods or at a desired timing.

5.2) Receiver

As illustrated in FIG. 9, the receiver 200B has the same configuration as the receiver 200 of the first example, but differs in that the DM 220 is provided in place of the mirror 204. The receiver 200B has an attenuation rate calculator 221, a communication section 222, and a controller 223. Hereinafter, circuit blocks similar to those previously described in the first example are denoted by the same reference numerals. Accordingly their descriptions will be omitted, and the different configurations and functions will be described mainly.

The polarizing beam splitter 201 inputs the received reference light pulse $Pr_{LO}$, the received signal light pulse $Pr_Q$ and the received probe light $Sr_p$ from the beam expander 210. As mentioned above, the polarization planes of the received probe light $Sr_p$ and the received reference light pulse $Pr_{LO}$ are orthogonal to that of the signal light pulse $Pr_Q$. Accordingly, the received signal light pulse $Pr_Q$ transmits through the polarizing beam splitter 201 as it is, while the received probe light $Sr_p$ and the received reference light pulse $Pr_{LO}$ are reflected by the polarizing beam splitter 201.

The received probe light $Sr_p$ and the received reference light pulse $Pr_{LO}$ are reflected by the polarizing beam splitter 201 to the DM 220. The DM 220 is configured to transmit light of wavelength λ2 and reflect light of other wavelengths (including λ1), contrary to the DM 123a on the transmitter side. Accordingly, the DM 220 reflects the reference light pulse $Pr_{LO}$ of wavelength λ1 and transmits the received probe light $Sr_p$ of wavelength λ2.

The received probe light $Sr_p$ transmitted through the DM 220 is detected by the photodetector PD3 for probe detection, which outputs the detection signal to the attenuation rate calculator 221. The attenuation rate calculator 221 calculates the attenuation rate (1−γ) from the received intensity of the received probe light $Sr_p$ obtained by the photodetector PD3 and the predetermined intensity of the probe light $S_p$ at the transmitter 100B.

The attenuation rate (1−γ) reflects not only transmission losses in the free space 300, but also the intensity reduction of the received probe light $Sr_p$ at the beam expander 210. In other words, the attenuation of the received probe light $Sr_p$ may be caused by misalignment of the focusing position of the output light of the beam expander 210 due to disturbances in the free space 300 as described above.

The controller 223 transmits the information including the attenuation rate (1−γ) to the transmitter 100B through the communication section 222 and the communication network D. In addition to the phase control of the phase modulator 206 described above, the controller 223 also controls the optical gain of the optical amplifier 205. The optical amplifier 205 amplifies the received reference light pulse $Pr_{LO}$ at an optical gain in response to the attenuation rate (1−γ), thereby maintaining the signal level of the signal output $I_{out}$ within a predetermined range. The controller 223 may prepare a function previously determined by measurement and calculate the optical gain as a function of the attenuation rate (1−γ). Alternatively, a correspondence table between the attenuation rate (1−γ) and the gain may be experimentally prepared. The gain of the optical amplifier 14 for the attenuation rate (1−γ) can be calculated by referring to the correspondence table. It should be noted that the control of the optical gain of the optical amplifier 205 may be performed when the attenuation rate (1−γ) or its change exceeds a predetermined threshold value.

5.3) Communication Control

Figure 10:
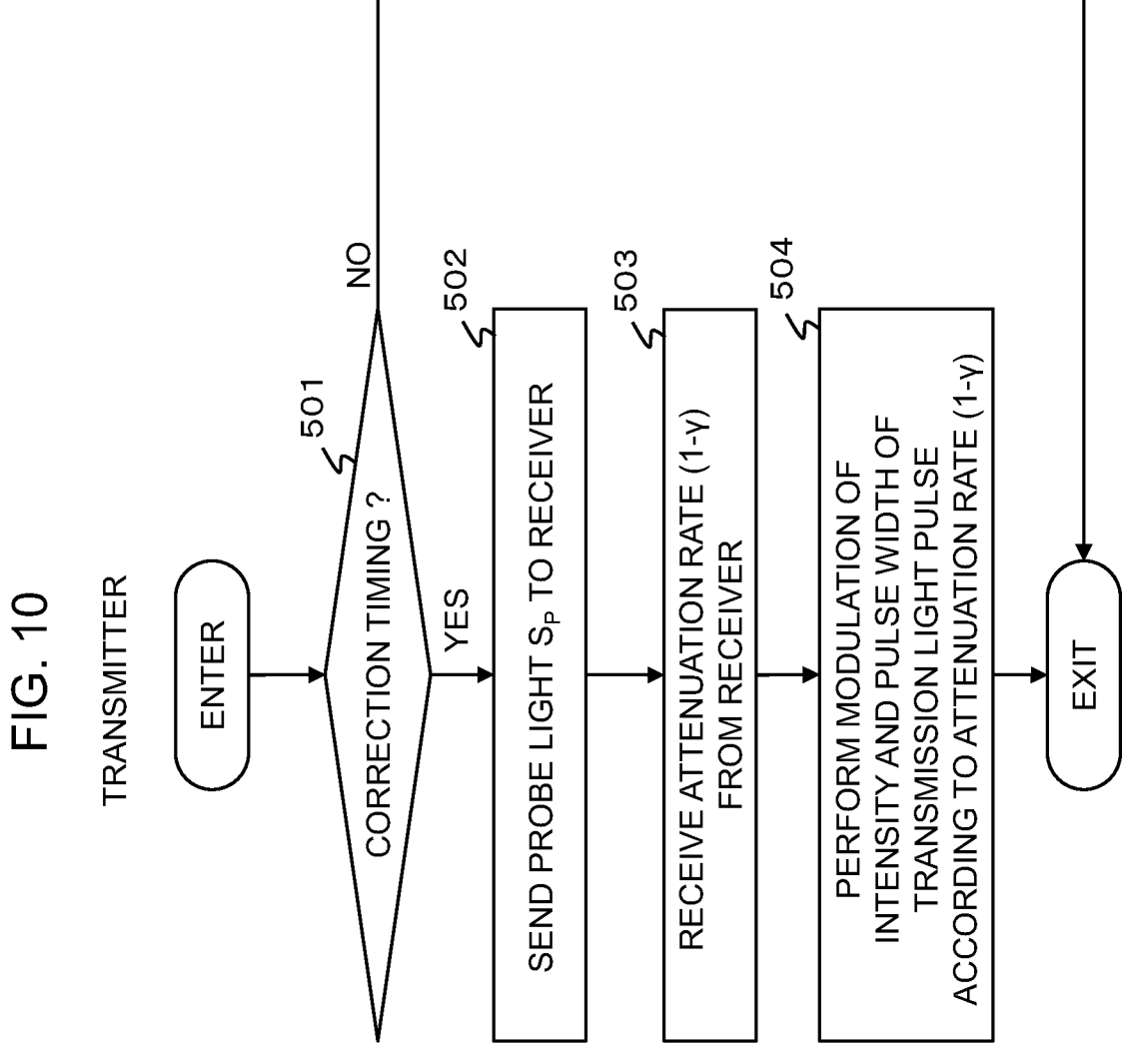
FIG. 10 is a flowchart illustrating the operation of the transmitter of the quantum cryptographic communication system according to the third example.

As illustrated in FIG. 10, the controller 131 of the transmitter 100B determines whether or not it is correction timing for each predetermined time slot (operation 501). If it is the correction timing (YES in operation 501), the laser light source 111 is driven to output the probe light $S_p$ to the transmitter-side optical system 110, which sends the probe light $S_p$ to the receiver 200B through the free space 300 (operation 502). The receiver 200B calculates an attenuation rate (1−γ) based on the received probe light $Sr_p$ as described above and sends the attenuation rate (1−γ) to the transmitter 100B.

When receiving information including the attenuation rate (1−γ) from the receiver 200B through the communication network D, the communication unit 132 outputs the attenuation rate (1−γ) to the controller 131 (operation 503). The controller 131 controls the intensity modulator 130 according to the attenuation rate (1−γ) such that modulation of the intensity and pulse width of the transmission light pulse are performed as described before (operation 504). If it is not correction timing (NO in operation 501), the above intensity and pulse width control is not performed and the previously set intensity and pulse width are maintained.

Figure 11:
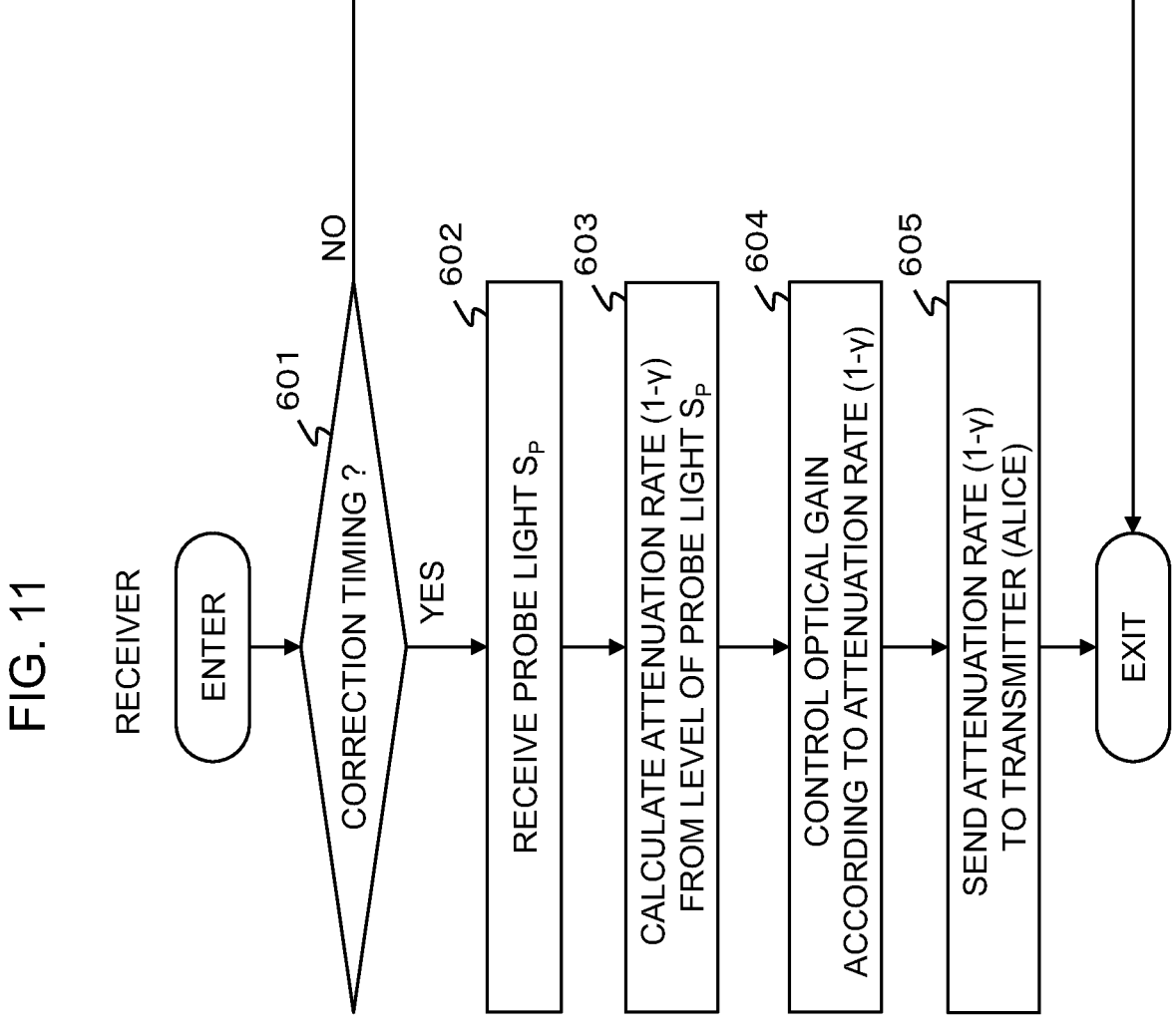
FIG. 11 is a flowchart illustrating the operation of the receiver of the quantum cryptographic communication system according to the third example.

Referring to FIG. 11, the controller 223 of the receiver 200B determines whether or not it is correction timing for each predetermined time slot (operation 601). If it is the correction timing (YES in operation 601), the photodetector PD3 receives the probe light $Sr_p$ and detects the level of the received probe light $Sr_p$ (operation 602). The attenuation rate calculator 221 inputs the detected level from photodetector PD3 and calculates the ratio of the detected level to the predetermined transmission level at the time of transmission of the probe light $S_p$ as the attenuation rate (1−γ) at the present moment (operation 603). The controller 223 determines an optical gain according to the attenuation ratio (1−γ) at the current time using a calculation formula or a correspondence table, and controls the optical gain of the optical amplifier 205 (operation 604). Furthermore, the controller 223 transmits the attenuation rate (1−γ) to the transmitter 100B through the communication network D (operation 605). If it is not the correction timing (NO in operation 601), the above optical gain is not controlled and the previously set optical gain is maintained.

As described above, in the system according to the third example, the transmitter 100B transmits the probe light $S_p$ to the receiver 200B through the free space 300. The receiver 200B calculates the attenuation rate (1−γ) and transmits it to the transmitter 100B. The receiver 200B controls the optical amplification factor of the received reference light LO according to the attenuation rate (1−γ). The transmitter 100B modulates the intensity and pulse width of the transmission light pulse according to the attenuation rate (1−γ) as described above. Thus, control of the intensity and pulse width at the transmitter 100B and control of the gain at the receiver 200B allow the signal output level $L_{out}$ at the receiver 200B to be maintained at the threshold value $L_{TH}$ or more. Furthermore, the optical signal output level $L_{out}$ can be maintained within a predetermined range according to the attenuation rate (1−γ).

6. Additional Statements

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

(Additional Statement 1)

A quantum cryptographic communication system comprising a transmitter and a receiver, wherein the transmitter and the receiver are optically connected to each other through an optical transmission line with propagation characteristics of light changing due to changes of environment, the transmitter includes:

an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse, the receiver includes:

an optical reception section configured to receive received signal light and received reference light arriving from the transmitter through the optical transmission line; and a signal detector configured to generate a signal output by interfering the received reference light with the received signal light, wherein either the transmitter or the receiver further includes an attenuation rate calculator that calculates an attenuation rate of probe light of the predetermined intensity, the probe light having propagated through the optical transmission line, and wherein the controller is configured to modulate the pulse intensity and the pulse width of the transmission light pulse according to the attenuation ratio.

(Additional Statement 2)

The quantum cryptographic communication system according to additional statement 1, wherein the controller is configured to modulate the pulse intensity and the pulse width of the transmission light pulse without changing energy of the transmission light pulse.

(Additional Statement 3)

The quantum cryptographic communication system according to additional statement 2, wherein the controller is configured to modulate the pulse intensity and the pulse width of the transmission light pulse according to the attenuation rate such that the intensity is changed from Ps to Ps/$\gamma$ and the pulse width is changed from t to $\gamma$t, where $\gamma$ is transmittance of the probe light of the predetermined intensity that has propagated through the optical transmission line, the attenuation rate is represented as (1$-\gamma$), Ps is the light intensity of the transmission light pulse, and t is the pulse width of the transmission light pulse.

(Additional Statement 4)

The quantum cryptographic communication system according to any one of additional statements 1-3, wherein the receiver further includes a mirror which reflects the probe light arriving through the optical transmission line back to the optical transmission line, and the transmitter further includes the attenuation rate calculator which calculates the attenuation rate using the probe light reflected from the mirror of the receiver.

(Additional Statement 5)

The quantum cryptographic communication system according to any one of additional statements 1-3, wherein the receiver further includes the attenuation rate calculator which calculates the attenuation rate using the probe light arriving through the optical transmission line, wherein the attenuation rate is notified to the transmitter.

(Additional Statement 6)

The quantum cryptographic communication system according to any one of additional statements 1-3, wherein the transmitter further includes a transmitter-side optical system configured to send the signal light, the reference light and the probe light to the optical transmission line, and the receiver further includes a receiver-side optical system configured to receive the signal light, the reference light and the probe light through the optical transmission line, wherein the transmitter-side optical system and the receiver-side optical system are provided so that their optical axes are aligned with each other, and wherein the optical transmission line is free space between the transmitter-side optical system and the receiver-side optical system.

(Additional Statement 7)

The quantum cryptographic communication system according to any one of additional statements 1-3, wherein the receiver further includes an optical amplifier provided between the optical reception section and the signal detector, the optical amplifier amplifying only the received reference light, and wherein an optical gain of the optical amplifier is controlled according to the attenuation rate.

(Additional Statement 8)

A transmitter that is optically connected to a receiver through an optical transmission line with propagation characteristics of light changing due to changes of environment in a quantum cryptographic communication system, the transmitter comprising:

an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse according to an attenuation rate of probe light of predetermined intensity, the probe light having propagated through the optical transmission line.

(Additional Statement 9)

The transmitter according to additional statement 8, wherein the controller is configured to modulate the pulse intensity and the pulse width of the transmission light pulse without changing energy of the transmission light pulse.

(Additional Statement 10)

The transmitter according to additional statement 9, wherein the controller is configured to modulate the pulse intensity and the pulse width of the transmission light pulse according to the attenuation rate such that the intensity is changed from Ps to Ps/$\gamma$ and the pulse width is changed from t to $\gamma$t, where $\gamma$ is transmittance of the probe light of the predetermined intensity that has propagated through the optical transmission line, the attenuation rate is represented as $(1-\gamma)$, Ps is the light intensity of the transmission light pulse, and t is the pulse width of the transmission light pulse.

(Additional Statement 11)

The transmitter according to any one of additional statements 8-10, further comprising:

a probe light transmission section configured to transmit the probe light to the optical transmission line;

a probe light detector that detects received probe light reflected from the receiver through the optical transmission line; and an attenuation rate calculator that calculates the attenuation rate using detection output of the probe light detector.

(Additional Statement 12)

The transmitter according to any one of additional statements 8-10, wherein the attenuation rate is received from the receiver.

(Additional Statement 13)

A communication control method in a quantum cryptographic communication system comprising a transmitter and a receiver, wherein the transmitter and the receiver are optically connected to each other through an optical transmission line with propagation characteristics of light changing due to changes of environment, the method comprising:

by the transmitter, generating signal light and reference light from a transmission light pulse of coherent light, and transmitting the signal light and the reference light to the optical transmission line, wherein the signal light is weak light having quantum states and the reference light is light having no quantum states; and by the receiver, receiving received signal light and received reference light arriving from the transmitter through the optical transmission line, and generating a signal output by interfering the received reference light with the received signal light, by an attenuation rate calculator provided in either the transmitter or the receiver, calculating an attenuation rate of probe light of the predetermined intensity, the probe light having propagated through the optical transmission line, and by a controller provided in the transmitter, modulating the pulse intensity and the pulse width of the transmission light pulse according to the attenuation ratio.

(Additional Statement 14)

A transmission control method in a transmitter that is optically connected to a receiver through an optical transmission line with propagation characteristics of light changing due to changes of environment in a quantum cryptographic communication system, the method comprising:

by an optical transmission section, generating signal light and reference light from a transmission light pulse of coherent light, and transmitting the signal light and the reference light to the optical transmission line, wherein the signal light is weak light having quantum states and the reference light is light having no quantum states; and by a controller, modulating pulse intensity and pulse width of the transmission light pulse according to an attenuation rate of probe light of predetermined intensity, the probe light having propagated through the optical transmission line.

(Additional Statement 15)

The transmission control method according to additional statement 14, wherein by the controller, the pulse intensity and the pulse width of the transmission light pulse are modulated without changing energy of the transmission light pulse.

(Additional Statement 16)

The transmission control method according to additional statement 15, wherein by the controller, the pulse intensity and the pulse width of the transmission light pulse are modulated such that the intensity is changed from Ps to Ps/$\gamma$ and the pulse width is changed from t to $\gamma$t, where $\gamma$ is transmittance of the probe light of the predetermined intensity that has propagated through the optical transmission line, the attenuation rate is represented as $(1-\gamma)$, Ps is the light intensity of the transmission light pulse, and t is the pulse width of the transmission light pulse.

(Additional Statement 17)

The transmission control method according to any one of additional statements 14-16, further comprising:

by a probe light transmission section, transmitting the probe light to the optical transmission line;

by a probe light detector, detecting received probe light reflected from the receiver through the optical transmission line; and by an attenuation rate calculator, calculating the attenuation rate using detection output of the probe light detector.

(Additional Statement 18)

The transmission control method according to any one of additional statements 14-16, wherein the attenuation rate is received from the receiver.

(Additional Statement 19)

A program functioning a computer as a transmitter that is optically connected to a receiver through an optical transmission line with propagation characteristics of light changing due to changes of environment in a quantum cryptographic communication system, the program comprising instructions to:

generate signal light and reference light from a transmission light pulse of coherent light, and transmit the signal light and the reference light to the optical transmission line, wherein the signal light is weak light having quantum states and the reference light is light having no quantum states; and modulate pulse intensity and pulse width of the transmission light pulse according to an attenuation rate of probe light of predetermined intensity, the probe light having propagated through the optical transmission line.

The present invention is applicable to quantum key distribution (QKD) systems.

The invention claimed is:

1. A transmitter that is optically connected to a receiver through an optical transmission line with propagation characteristics of light changing due to changes of environment in a quantum cryptographic communication system, the transmitter comprising:

an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse according to a transmission line state detected based on probe light of predetermined intensity, wherein the probe light is transmitted from one of the transmitter and the receiver to the other through the optical transmission line, and wherein the transmission line state is calculated at one of the transmitter and the receiver based on the probe light.

2. The transmitter according to claim 1, wherein the controller is configured to modulate the pulse intensity and the pulse width of the transmission light pulse without changing energy of the transmission light pulse.

3. The transmitter according to claim 2, wherein the controller is configured to modulate the pulse intensity and the pulse width of the transmission light pulse according to the transmission line state such that the intensity is changed from Ps to Ps/$\gamma$ and the pulse width is changed from t to $\gamma$t, where $\gamma$ is transmittance of the probe light of the predetermined intensity that has propagated through the optical transmission line, Ps is the light intensity of the transmission light pulse, and t is the pulse width of the transmission light pulse, wherein the transmission line state is represented as $\gamma$ or (1-$\gamma$).

4. The transmitter according to claim 1, further comprising:

a probe light transmission section configured to transmit the probe light to the optical transmission line;

a probe light detector configured to detect received probe light reflected from the receiver through the optical transmission line; and a calculator configured to calculate the transmission line state using detection output of the probe light detector.

5. The transmitter according to claim 1, wherein the transmission line state is received from the receiver.

6. A transmission control method in a transmitter that is optically connected to a receiver through an optical transmission line with propagation characteristics of light changing due to changes of environment in a quantum cryptographic communication system, the method comprising:

by an optical transmission section:

a) generating signal light and reference light from a transmission light pulse of coherent light; and b) transmitting the signal light and the reference light to the optical transmission line, wherein the signal light is weak light having quantum states and the reference light is light having no quantum states; and by a controller:

c) modulating pulse intensity and pulse width of the transmission light pulse according to a transmission line state detected based on probe light of predetermined intensity, wherein the probe light is transmitted from one of the transmitter and the receiver to the other through the optical transmission line, and wherein the transmission line state is calculated at one of the transmitter and the receiver based on the probe light.

7. The transmission control method according to claim 6, wherein the c) is performed without changing energy of the transmission light pulse.

8. The transmission control method according to claim 7, wherein the c) is performed such that the intensity is changed from Ps to Ps/$\gamma$ and the pulse width is changed from t to $\gamma$t, where $\gamma$ is transmittance of the probe light of the predetermined intensity that has propagated through the optical transmission line, Ps is the light intensity of the transmission light pulse, and t is the pulse width of the transmission light pulse, wherein the transmission line state is represented as $\gamma$ or (1-$\gamma$).

9. The transmission control method according to claim 6, further comprising:

by a probe light transmission section, transmitting the probe light to the optical transmission line;

by a probe light detector, detecting received probe light reflected from the receiver through the optical transmission line; and by an attenuation rate calculator, calculating the transmission line state using detection output of the probe light detector.

10. The transmission control method according to claim 6, wherein the transmission line state is received from the receiver.

11. A quantum cryptographic communication system comprising a transmitter and a receiver, wherein the transmitter and the receiver are optically connected to each other through an optical transmission line with propagation characteristics of light changing due to changes of environment, wherein the transmitter includes:

an optical transmission section configured to generate signal light and reference light from a transmission light pulse of coherent light, and transmit the signal light and the reference light to the optical transmission line, wherein the signal light is weak light having quantum states and the reference light is light having no quantum states; and a controller configured to modulate pulse intensity and pulse width of the transmission light pulse, wherein the receiver includes:

an optical reception section configured to receive received signal light and received reference light arriving from the transmitter through the optical transmission line; and a signal detector configured to generate a signal output by interfering the received reference light with the received signal light, wherein either the transmitter or the receiver further includes a calculator that calculates a transmission line state detected based on probe light of the predetermined intensity, the probe light having propagated through the optical transmission line, and wherein the controller is configured to modulate the pulse intensity and the pulse width of the transmission light pulse according to the transmission line state.

12. The quantum cryptographic communication system according to claim 11, wherein the controller is configured to modulate the pulse intensity and the pulse width of the transmission light pulse without changing energy of the transmission light pulse.

13. The quantum cryptographic communication system according to claim 12, wherein the controller is configured to modulate the pulse intensity and the pulse width of the transmission light pulse according to the transmission line state such that the intensity is changed from Ps to Ps/$\gamma$ and the pulse width is changed from t to $\gamma$t, where $\gamma$ is transmittance of the probe light of the predetermined intensity that has propagated through the optical transmission line, Ps is the light intensity of the transmission light pulse, and t is the pulse width of the transmission light pulse, wherein the transmission line state is represented as $\gamma$ or (1-y$\gamma$).

14. The quantum cryptographic communication system according to claim 11, wherein the receiver further includes a mirror configured to reflect the probe light arriving through the optical transmission line back to the optical transmission line, and wherein the transmitter further includes the attenuation rate calculator configured to calculate the transmission line state using the probe light reflected from the mirror of the receiver.

15. The quantum cryptographic communication system according to claim 11, wherein the receiver further includes the calculator configured to calculate the transmission line state using the probe light arriving through the optical transmission line, wherein the transmission line state is notified to the transmitter.

16. The quantum cryptographic communication system according to claim 11, wherein the transmitter further includes a transmitter-side optical system configured to send the signal light, the reference light and the probe light to the optical transmission line, wherein the receiver further includes a receiver-side optical system configured to receive the signal light, the reference light and the probe light through the optical transmission line, and wherein the transmitter-side optical system and the receiver-side optical system are provided so that their optical axes are aligned with each other, and wherein the optical transmission line is free space between the transmitter-side optical system and the receiver-side optical system.

17. The quantum cryptographic communication system according to claim 11, wherein the receiver further includes an optical amplifier provided between the optical reception section and the signal detector, the optical amplifier amplifying being configured to amplify only the received reference light, and wherein an optical gain of the optical amplifier is controlled according to the transmission line state.

* * * * *